(12) United States Patent
Akashika

(10) Patent No.: US 12,153,659 B2
(45) Date of Patent: Nov. 26, 2024

(54) AUTHENTICATION SYSTEM, AUTHENTICATION METHOD AND PROGRAM

(71) Applicant: Rakuten Group, Inc., Tokyo (JP)

(72) Inventor: Hideki Akashika, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 307 days.

(21) Appl. No.: 17/623,152

(22) PCT Filed: Dec. 28, 2020

(86) PCT No.: PCT/JP2020/049148
§ 371 (c)(1),
(2) Date: Dec. 27, 2021

(87) PCT Pub. No.: WO2022/144981
PCT Pub. Date: Jul. 7, 2022

(65) Prior Publication Data
US 2023/0252124 A1    Aug. 10, 2023

(51) Int. Cl.
*G06F 21/36* (2013.01)
*G06F 21/34* (2013.01)
(Continued)

(52) U.S. Cl.
CPC ............. *G06F 21/34* (2013.01); *G06F 21/36* (2013.01); *G06F 21/45* (2013.01); *G06Q 20/04* (2013.01);
(Continued)

(58) Field of Classification Search
CPC .......... G06F 21/34; G06F 21/36; G06F 21/45; G06Q 20/04; G06Q 20/34; G06Q 20/40; G06V 30/1444; G06V 30/41; G07D 7/003
(Continued)

(56) References Cited

U.S. PATENT DOCUMENTS 10,320,807 B2 * 6/2019 Khan .................... H04L 63/123
11,144,752 B1 * 10/2021 Castelblanco et al. .....................
G06K 9/00456
(Continued)

FOREIGN PATENT DOCUMENTS

JP    2007-122503 A    5/2007
JP    2015-141501 A    8/2015
(Continued)

OTHER PUBLICATIONS

Method and Apparatus for Mobil Identity Authentication, Mar. 29, 2010, IP.com Journal. (Year: 2010).*
(Continued)

*Primary Examiner* — Scott C Anderson
*Assistant Examiner* — George N. Proios
(74) *Attorney, Agent, or Firm* — Sughrue Mion, PLLC

(57) ABSTRACT

Provided is an authentication system (S) configured as follows. Input information acquisition means (101, 201) acquires input information, which relates to a feature of an outer appearance of a card possessed by a user, and has been input from a user terminal (30). Identification information acquisition means (104, 202) acquires identification information that enables identification of the card. Registered information acquisition means (105, 203) acquires registered information, which relates to the feature of the outer appearance, and has been registered in a server (10, 20) in association with the identification information in advance. Authentication means (102) executes the authentication based on the input information and the registered information.

18 Claims, 15 Drawing Sheets

(51) Int. Cl.
| | |
|---|---|
| *G06F 21/45* | (2013.01) |
| *G06Q 20/04* | (2012.01) |
| *G06Q 20/34* | (2012.01) |
| *G06Q 20/40* | (2012.01) |
| *G06V 30/14* | (2022.01) |
| *G06V 30/41* | (2022.01) |
| *G07D 7/00* | (2016.01) |

(52) U.S. Cl.
CPC ............. *G06Q 20/34* (2013.01); *G06Q 20/40* (2013.01); *G06V 30/1444* (2022.01); *G06V 30/41* (2022.01); *G07D 7/003* (2017.05); *G06F 2221/2117* (2013.01)

(58) Field of Classification Search
USPC .......................................................... 705/44
See application file for complete search history.

(56) References Cited

U.S. PATENT DOCUMENTS

| | | | |
|---|---|---|---|
| 2015/0089615 A1* | 3/2015 | Krawczyk et al. | ..... G06F 21/31 |
| 2017/0177852 A1* | 6/2017 | Krawczyk et al. | ..... G06F 21/36 |
| 2022/0084320 A1* | 3/2022 | Ito et al. | ................... G07B 5/02 |

FOREIGN PATENT DOCUMENTS

| | | |
|---|---|---|
| JP | 2020-177368 A | 10/2020 |
| WO | 2014/016883 A1 | 1/2014 |

OTHER PUBLICATIONS

International Search Report for PCT/JP2020/049148 dated Mar. 16, 2021 [PCT/ISA/210].
Written Opinion for PCT/JP2020/049148 dated Mar. 16, 2021 [PCT/ISA/237].
Office Action dated Mar. 15, 2020 from the Japanese Patent Office in JP Application No. 2021-575403.

* cited by examiner

FIG.5

| USER ACCOUNT | PASSWORD | FULL NAME | CARD INFORMATION ||||
| --- | --- | --- | --- | --- | --- | --- |
| | | | CARD NUMBER | EXPIRATION DATE | FULL NAME | ... |
| u00001 | ******** | TARO YAMADA | 12345678901234456 | 2021/5/31 | TARO YAMADA | ... |
| u00002 | ****** | HANAKO SUZUKI | 12523309489309943 | 2021/6/30 | HANAKO SUZUKI | ... |
| u00003 | ********** | JIRO KIMURA | 71901939500001321 | 2022/10/31 | ZIRO KIMURA | ... |
| ... | ... | ... | ... | ... | ... | ... |

| CARD INFORMATION ||||| REGISTERED IMAGE |
| --- | --- | --- | --- | --- | --- |
| CARD NUMBER | EXPIRATION DATE | FULL NAME | | | |
| 1234567890123456 | 2021/5/31 | TARO YAMADA | ... | ... | a00001.jpg |
| 1252330948930943 | 2021/6/30 | HANAKO SUZUKI | ... | ... | a00002.jpg |
| 7190193950001321 | 2022/10/31 | JIRO KIMURA | ... | ... | a00003.jpg |
| ... | ... | ... | ... | ... | ... |

DB2

FIG.11
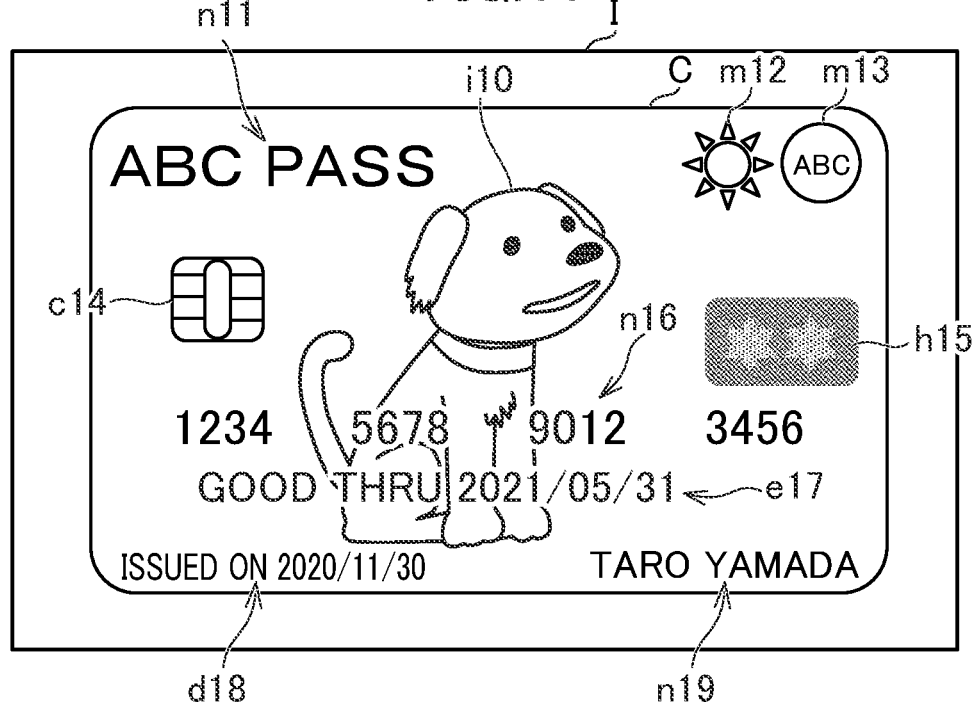
MASK FOREGROUND
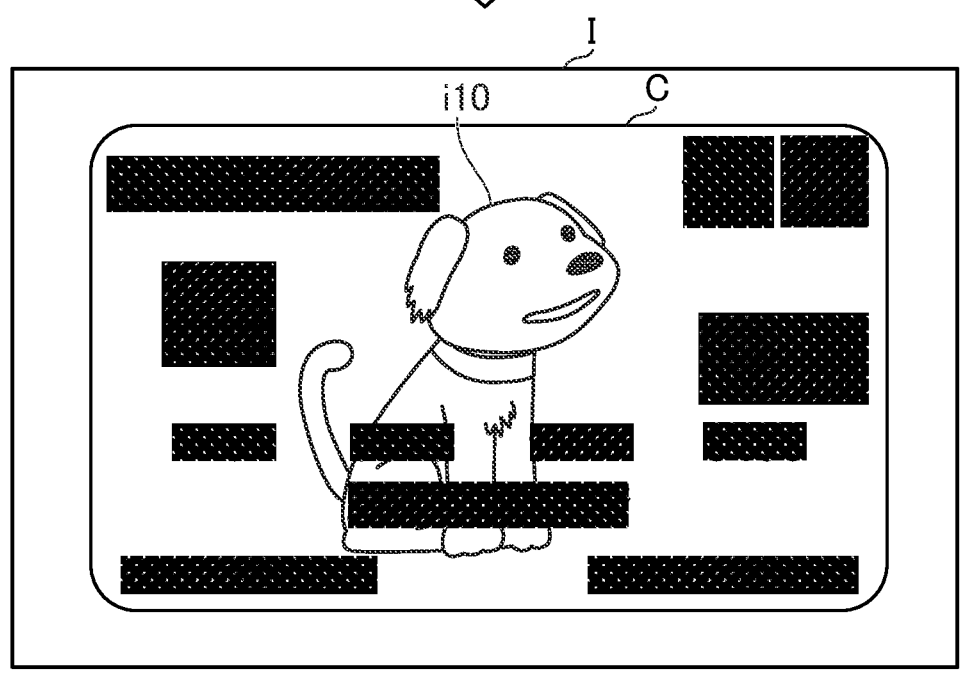

FIG.12
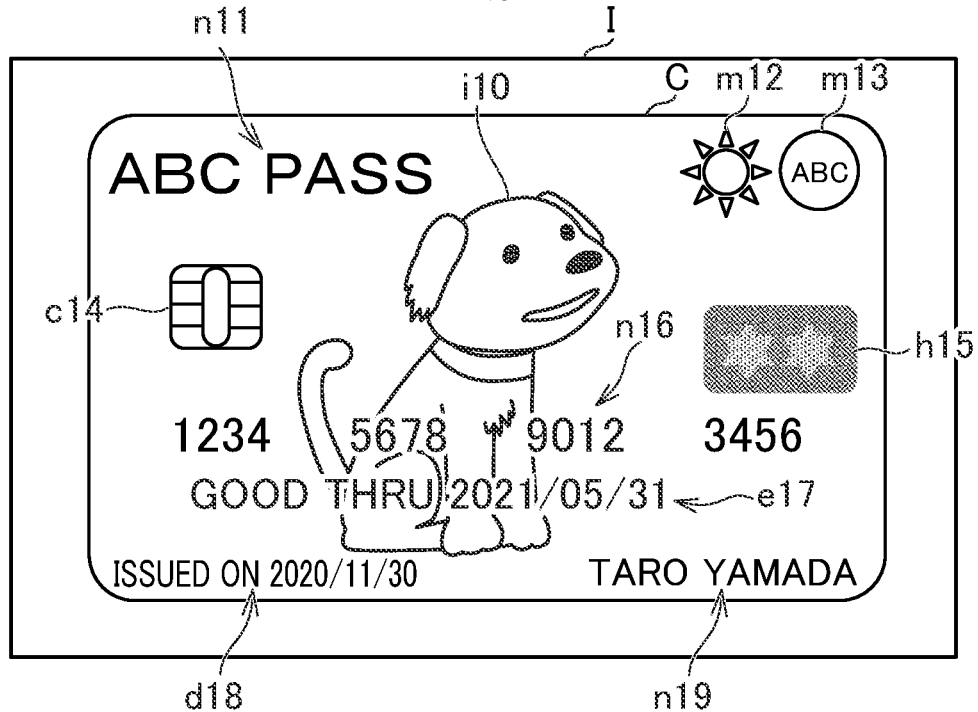
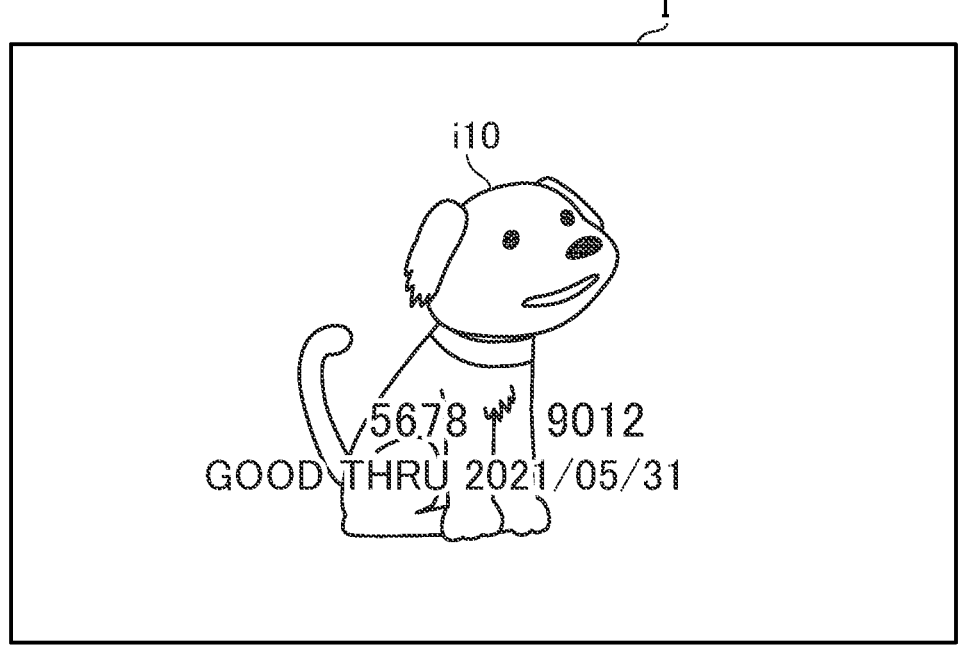

FIG.13
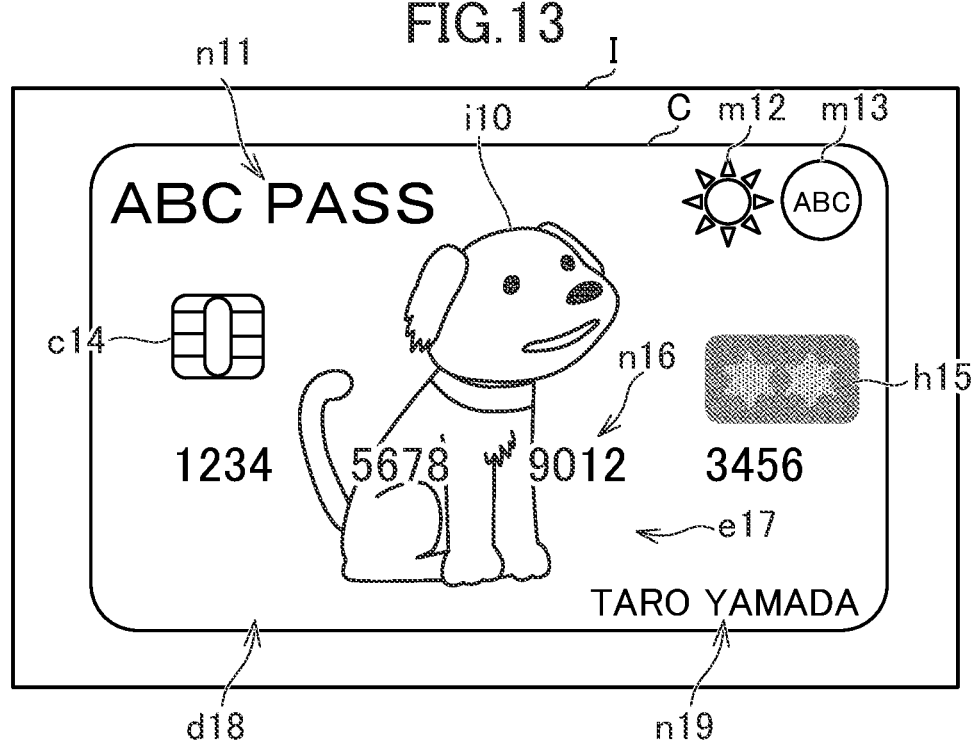
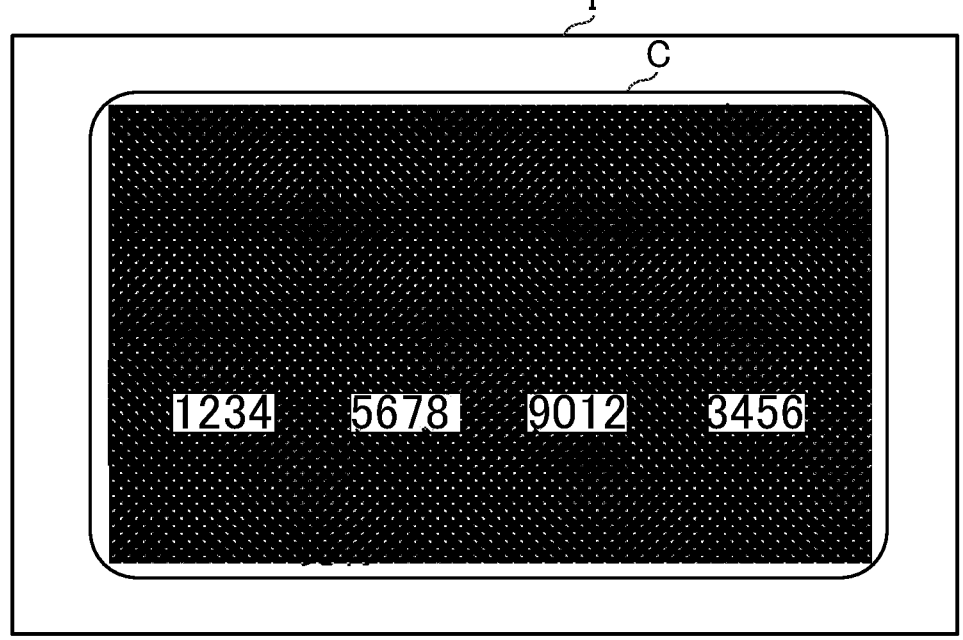

FIG.14
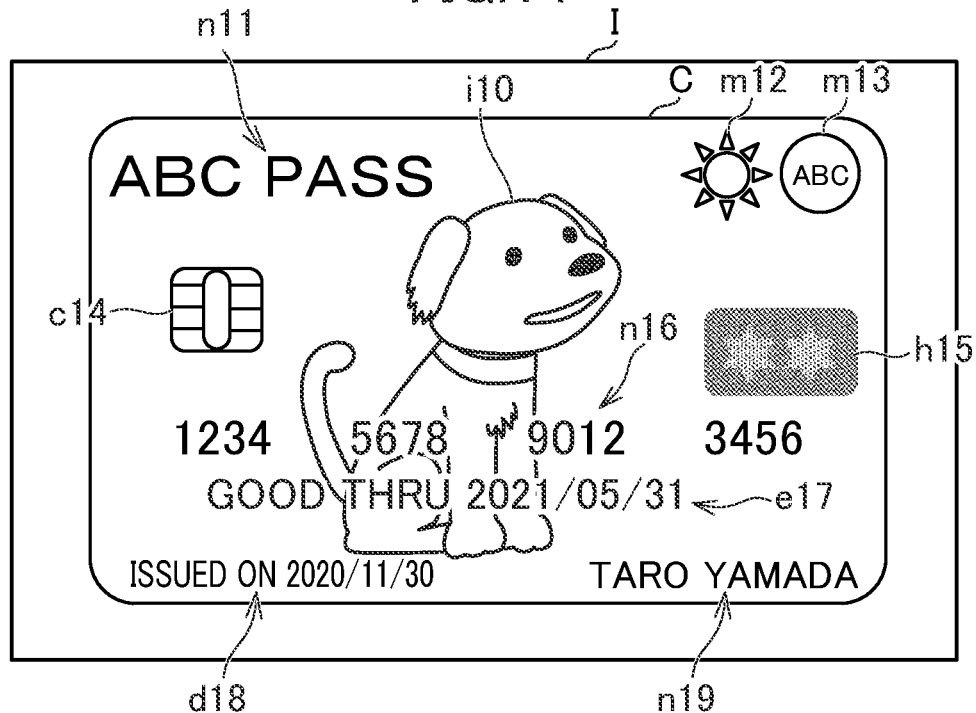
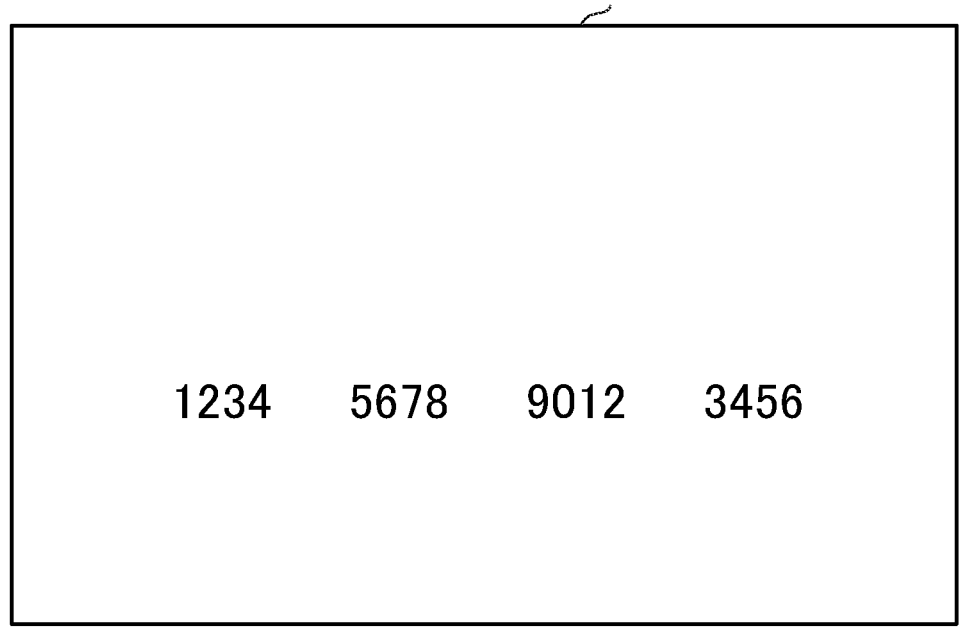

AUTHENTICATION SYSTEM, AUTHENTICATION METHOD AND PROGRAM

CROSS REFERENCE TO RELATED APPLICATIONS

This application is a National Stage of International Application No. PCT/JP2020/049148 filed Dec. 28, 2020.

TECHNICAL FIELD

The present disclosure relates to an authentication system, an authentication method, and a program.

BACKGROUND ART

Hitherto, in order to prevent a malicious third party from committing a fraud, there has been known a technology relating to possession authentication utilizing a card possessed by a user. For example, in Patent Literature 1, there is described a technology for determining forgery of an IC card by comparing verification information including feature information extracted by photographing a random pattern formed on a front side of the IC card and identification information acquired from an IC chip of the IC card and comparative verification information being a correct answer stored in advance to each other.

CITATION LIST

Patent Literature

[PTL 1] WO 2014/016883 A1

SUMMARY OF INVENTION

Technical Problem

However, with the technology of Patent Literature 1, it is impossible to determine forgery of an IC card on which a random pattern is not formed, and it is also impossible to determine forgery of a card on which an IC chip is not mounted. The technology of Patent Literature 1 exhibits no general versatility because the technology enables determination of only forgery of an extremely special card, and hence it has not been possible to sufficiently enhance security in possession authentication.

An object of the present disclosure is to enhance security in possession authentication.

Solution to Problem

According to one aspect of the present disclosure, there is provided an authentication system including: input information acquisition means configured to acquire input information, which relates to a feature of an outer appearance of a card possessed by a user, and has been input from a user terminal; identification information acquisition means configured to acquire identification information that enables identification of the card; registered information acquisition means configured to acquire registered information, which relates to the feature of the outer appearance, and has been registered in a server in association with the identification information in advance; and authentication means configured to execute authentication based on the input information and the registered information.

Advantageous Effects of Invention

According to the present disclosure, the security in the possession authentication is enhanced.

BRIEF DESCRIPTION OF DRAWINGS

FIG. 5 is a table for showing a data storage example of a user database.
FIG. 6 is a table for showing a data storage example of a card database.
FIG. 11 is a view for illustrating an example of authentication performed with attention being given to a design of a background of a card.
FIG. 12 is a view for illustrating an example of the authentication performed with attention being given to the design of the background of the card.
FIG. 13 is a view for illustrating an example of authentication performed with attention being given to a design of a foreground of the card.
FIG. 14 is a view for illustrating an example of the authentication performed with attention being given to the design of the foreground of the card.

DESCRIPTION OF EMBODIMENTS

1. First Embodiment

Now, an example of an authentication system according to a first embodiment of the present disclosure is described. In the authentication system, possession authentication is executed. The possession authentication is authentication utilizing an object possessed only by a valid person. The object to be utilized for the possession authentication is not limited to a tangible object, and may be an intangible object, for example, electronic data. In the first embodiment, possession authentication utilizing a transportation-related IC card (hereinafter referred to simply as "card") is taken as an example. The possession authentication may hereinafter be referred to simply as "authentication."

[1-1. Overall Configuration of Authentication System]

Figure 1:
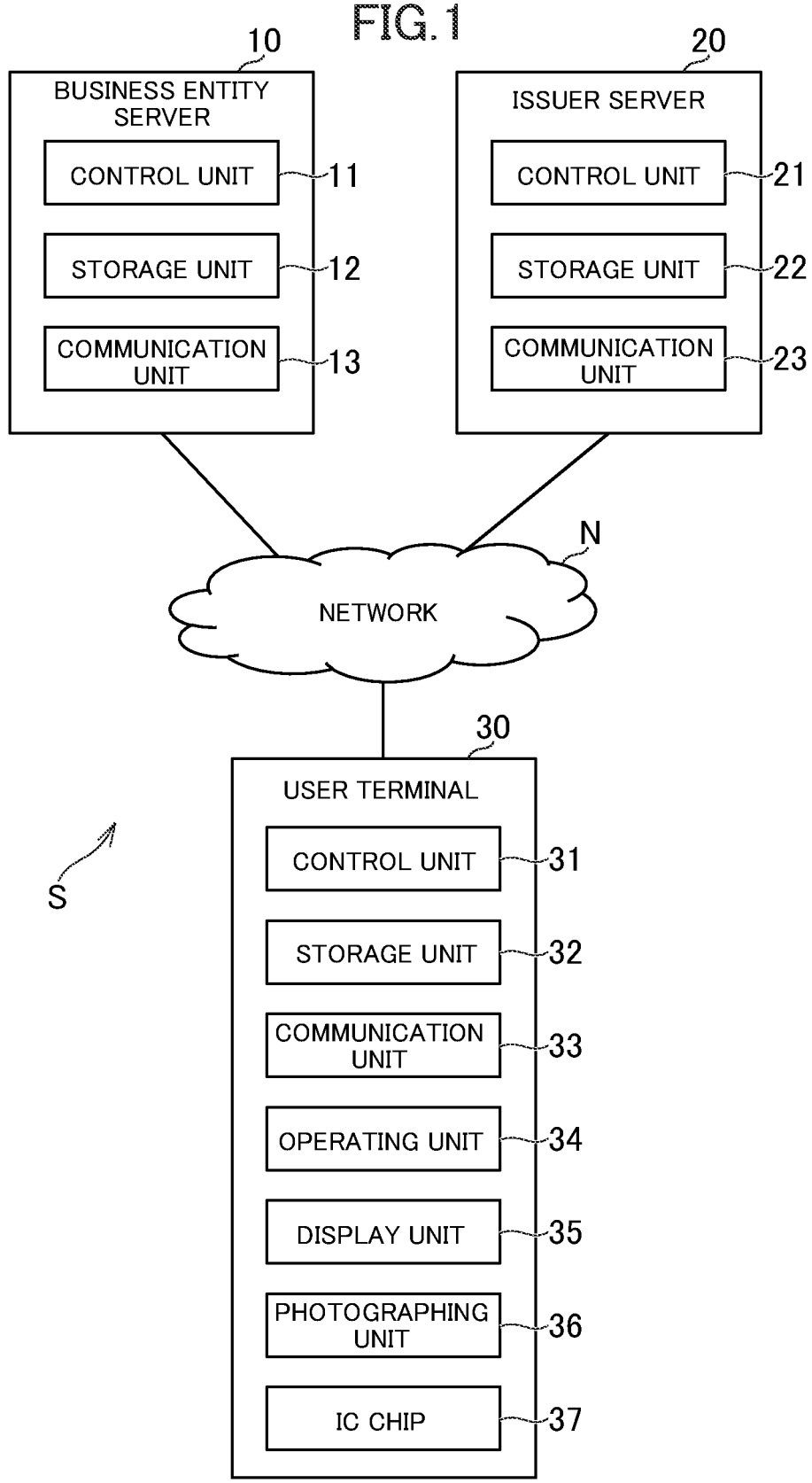
FIG. 1 is a diagram for illustrating an example of an overall configuration of an authentication system.

FIG. 1 is a diagram for illustrating an example of an overall configuration of the authentication system. As illustrated in FIG. 1, an authentication system S includes a business entity server 10, an issuer server 20, and a user terminal 30. Each of the business entity server 10, the issuer server 20, and the user terminal 30 can be connected to a network N, for example, the Internet. In FIG. 1, one business entity server 10, one issuer server 20, and one user terminal 30 are illustrated, but there may be a plurality of business entity servers 10, a plurality of issuer servers 20, and a plurality of user terminals 30.

The business entity server 10 is a server computer corresponding to a business entity that provides a service using a card. The business entity is an entity that provides a service to a user. In the first embodiment, a transportation-related service using a card is taken as an example, and hence the business entity is, for example, a railroad company or a bus company.

The business entity server 10 includes a control unit 11, a storage unit 12, and a communication unit 13. The control unit 11 includes at least one processor. The storage unit 12 includes a volatile memory, for example, a RAM, and a nonvolatile memory, for example, a hard disk drive. The communication unit 13 includes at least one of a communication interface for wired communication or a communication interface for wireless communication.

The issuer server 20 is a server computer corresponding to an issuer that has issued a card. The issuer is an entity that provides a card to a user. In the first embodiment, a case in which the issuer and the business entity are the same is described, but the issuer and the business entity may be different from each other. The issuer server 20 includes a control unit 21, a storage unit 22, and a communication unit 23. Physical configurations of the control unit 21, the storage unit 22, and the communication unit 23 may be the same as those of the control unit 11, the storage unit 12, and the communication unit 13, respectively.

The user terminal 30 is a computer to be operated by a user. For example, the user terminal 30 is a smartphone, a tablet computer, a wearable terminal, or a personal computer. The user terminal 30 includes a control unit 31, a storage unit 32, a communication unit 33, an operating unit 34, a display unit 35, a photographing unit 36, and an IC chip 37. Physical configurations of the control unit 31, the storage unit 32, and the communication unit 33 are the same as those of the control unit 11, the storage unit 12, and the communication unit 13, respectively.

The operating unit 34 is an input device, for example, a touch panel. The display unit 35 is a liquid crystal display or an organic EL display. The photographing unit 36 includes at least one camera. The IC chip 37 is a chip capable of short-range wireless communication. The IC chip 37 may be a chip of any standards, for example, a chip of FeliCa (trademark) or a chip of a so-called Type A or Type B among the non-contact type standards. The IC chip 37 includes hardware including an antenna conforming to the standards, and stores, for example, information required for a service to be used by a user.

At least one of programs or data stored in the storage units 12, 22, and 32 may be supplied thereto via the network N. Further, each of the business entity server 10, the issuer server 20, and the user terminal 30 may include at least one of a reading unit (e.g., an optical disc drive or a memory card slot) for reading a computer-readable information storage medium, or an input/output unit (e.g., a USB port) for inputting and outputting data to/from an external device. For example, at least one of the program or the data stored in the information storage medium may be supplied through intermediation of at least one of the reading unit or the input/output unit.

[1-2. Outline of First Embodiment]

In the first embodiment, processing of the authentication system S is described by taking as an exemplary case in which a user registers a card in a transportation-related application (hereinafter referred to simply as "app"). The app in the first embodiment is a program for using a transportation-related service through use of the user terminal 30. The app has been downloaded and installed in the user terminal 30 in advance.

The registering of a card in the app means enabling a service equivalent to a service available through use of the card to be used from the app. For example, enabling use of card information from the app, associating the card information with the app, or associating the card information with a user account corresponds to the registering of the card in the app. In addition, for example, recording the card information in the business entity server 10 or the IC chip 37 corresponds to the registering of the card in the app.

The card information is information that can identify the card. The card information includes at least a card number. The card number is a number that uniquely identifies the card. The card information may include supplementary information that accompanies the card. The supplementary information is information other than the card number, for example, an expiration date of the card, a full name of the user, or an issue date of the card.

For example, the user registers use of the app to have a user account and other information issued. After that, in order to register the card in the app, the user performs an operation for registering the card from, for example, a menu of the app. When this operation is performed, the photographing unit 36 is activated, and a photographing screen for photographing a card by the photographing unit 36 is displayed on the display unit 35. The photographing screen may be displayed as a part of a procedure for registering the use of the app.

Figure 2:
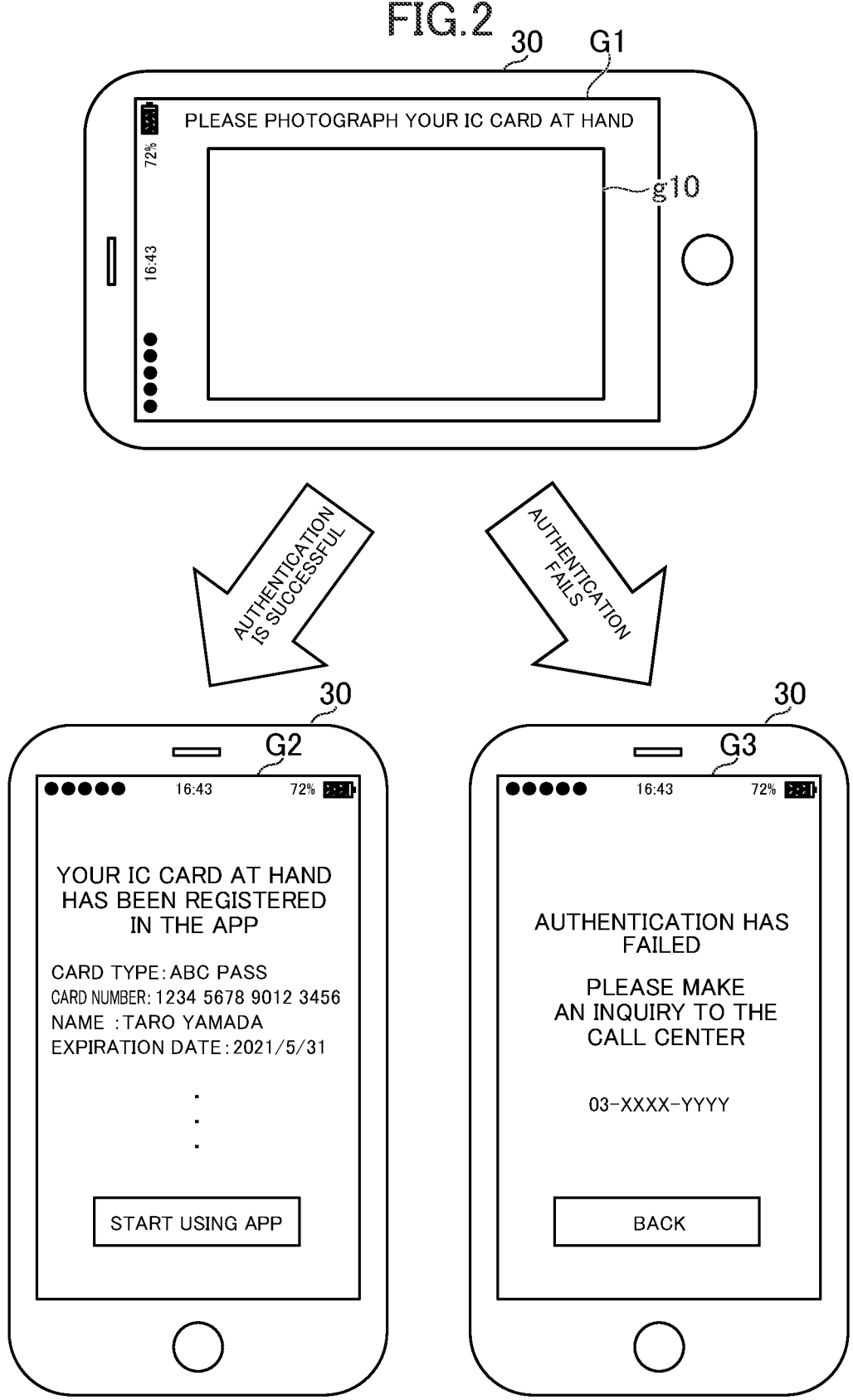
FIG. 2 is a view for illustrating an example of a photographing screen.

FIG. 2 is a view for illustrating an example of the photographing screen. As illustrated in FIG. 2, on a photographing screen G1, photographed images continuously acquired by the photographing unit 36 are displayed. A guide g10 for showing a guide to a positional relationship between the photographing unit 36 and the card is displayed over the photographed image. In the first embodiment, it is demanded that the card be photographed from the front in a predetermined size. For example, the user places the card on a desk, and photographs the card so that edges of the card fit the guide g10.

When the user photographs the card, the user terminal 30 transmits the photographed image of the card to the business entity server 10. This photographed image is an image input from the user terminal 30 to the business entity server 10, and is hence hereafter referred to as "input image." The "input" in the first embodiment means transmitting data.

Figure 3:
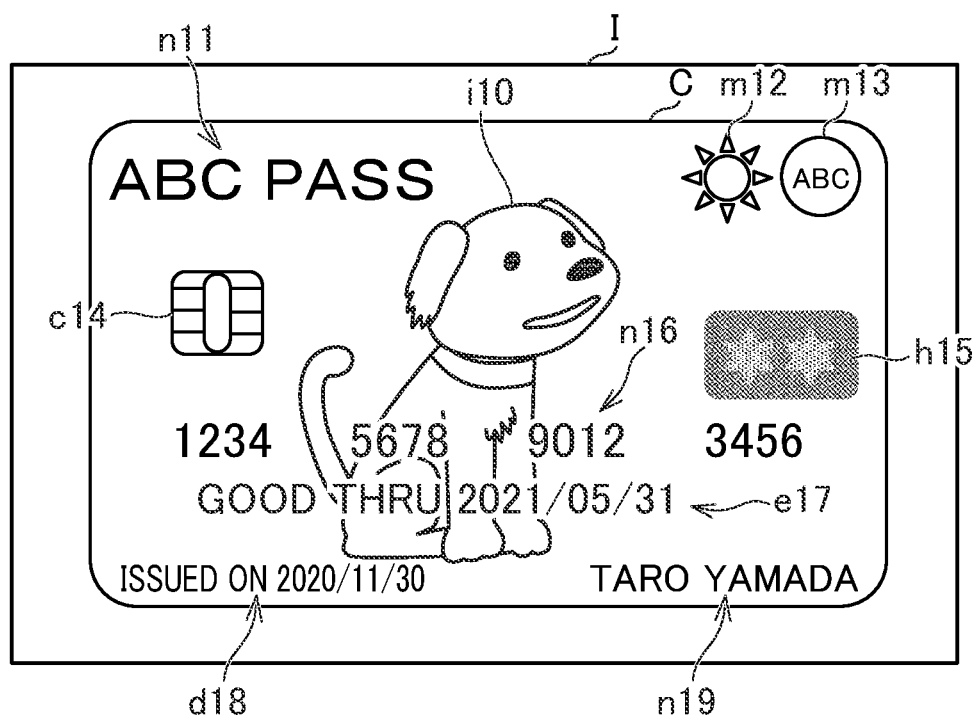
FIG. 3 is a view for illustrating an example of an input image.

FIG. 3 is a view for illustrating an example of the input image. As illustrated in FIG. 3, various kinds of information included in a card C have been captured in an input image I. For example, in the input image I, information including characters or numerals printed on a surface of the card C, information visually recognizable based on an uneven shape obtained by an embossing process, or a portion exposed to the outside of the card C has been captured.

In the example of FIG. 3, the input image I includes an illustration i10, a card name n11, marks m12 and m13, an IC chip c14, a hologram h15, a card number n16, an expiration date e17, an issue date d18, and a full name n19. The IC chip c14 is a chip embedded in the card C itself, and is different from the IC chip 37 of the user terminal 30. A portion of the IC chip c14 exposed from the card C appears in the input image I.

In the first embodiment, a registered image in which the issued card C has been captured is registered in the issuer server 20. Accordingly, when the user is a valid owner of the card C, the registered image in which the same card C as the input image I has been captured is registered in the issuer server 20. When the business entity server 10 receives the input image I from the user terminal 30, the business entity server 10 transfers the input image I to the issuer server 20. The issuer server 20 determines similarity or dissimilarity between the input image I and the registered image. The issuer server 20 transmits a result of the determination to the business entity server 10.

When the business entity server 10 receives the determination result indicating that the input image I and the registered image are similar, the business entity server 10 determines that the user is a valid owner, and the authentication is successful. In this case, as illustrated in FIG. 2, a success screen G2 indicating that the authentication is successful and the registration has been completed is displayed on the user terminal 30. From then on, the user can use, from the app, the same service as that available when the physical card C is used.

When the business entity server 10 receives the determination result indicating that the input image I and the registered image are dissimilar, the business entity server 10 determines that the user is not a valid owner, and the authentication fails. In this case, as illustrated in FIG. 2, a success screen G3 indicating that the authentication fails and the registration has not been completed is displayed on the user terminal 30. The user returns to the photographing screen G1 to photograph the card C again, or performs an inquiry to a call center, for example.

As described above, in the authentication system S, the authentication is executed based on the input image I in which the card C possessed by the user has been captured and the registered image registered in advance in the issuer server 20. Even when a malicious third party attempts to register the illegally obtained card information in the app, a feature of an outer appearance of the card C cannot be known, and hence the authentication cannot be successful. In the first embodiment, security in possession authentication is enhanced by utilizing the feature of the outer appearance of the card C. Now, details of this technology are described.

[1-3. Functions Implemented in First Embodiment]

Figure 4:
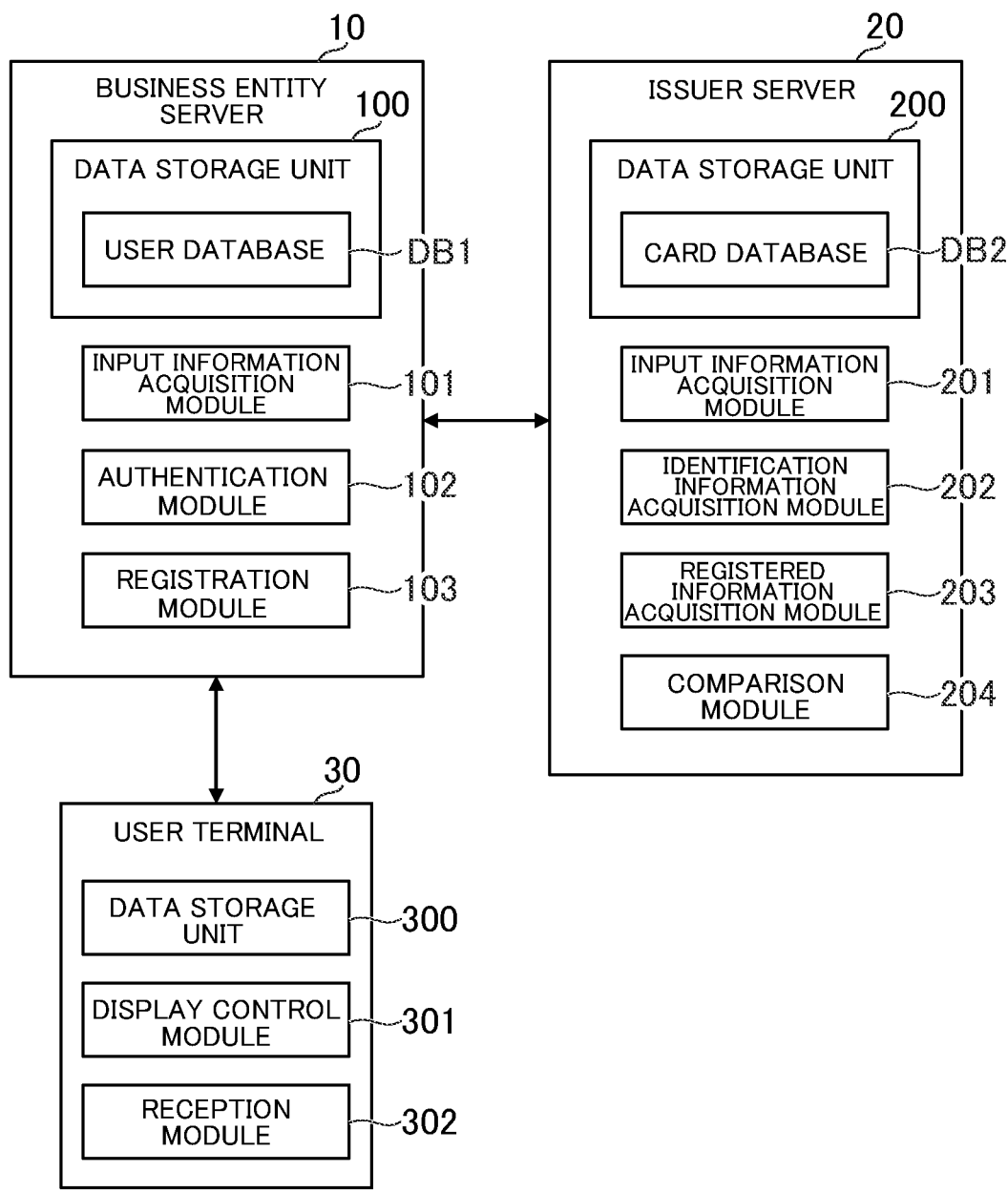
FIG. 4 is a functional block diagram for illustrating an example of functions implemented by the authentication system according to a first embodiment of the present disclosure.

FIG. 4 is a functional block diagram for illustrating an example of functions implemented by the authentication system S according to the first embodiment. In this case, the functions implemented by each of the business entity server 10, the issuer server 20, and the user terminal 30 are described.

[1-3-1. Functions implemented on Business Entity Server]

As illustrated in FIG. 4, on the business entity server 10, a data storage unit 100, an input information acquisition module 101, an authentication module 102, and a registration module 103 are implemented. The data storage unit 100 is implemented mainly by the storage unit 12. Each of the other functions is mainly implemented by the control unit 11.

[Data Storage Unit]

The data storage unit 100 stores the data required for authentication. For example, a user database DB1 is described for the data storage unit 100.

FIG. 5 is a table for showing a data storage example of the user database DB1. As shown in FIG. 5, the user database DB1 is a database in which information relating to users is stored. For example, the user database DB1 stores a user account, a password, a full name, and card information. When a user has registered the use of a service, a user account is issued, and a new record is created in the user database DB1. This record stores a password and a full name that have been designated at a time of registration.

In the first embodiment, a case in which the card information is registered after registration of the use of the service has been completed is described, but the card information may be registered at a time of the registration of the use of the service. The card information stored in the user database DB1 is card information of the card C registered in the app. The number of cards C that can be registered in the app is not limited to one, and a plurality of cards may be registered in the app.

The card information stored in the user database DB1 is only required to include minimum information for providing the service. That is, not all pieces of supplementary information of the card C are required to be stored in the user database DB1. The card information stored in the user database DB1 may be only the card number, or may include information (for example, a security code or a password in so-called 3-D Secure) other than the information shown in FIG. 5. The details of the card information are shown as they are in FIG. 5, but the card information may be stored in the user database DB1 in a hashed state.

[Input Information Acquisition Module]

The input information acquisition module 101 acquires the input image input from the user terminal 30. In the first embodiment, the business entity server 10 directly communicates to/from the user terminal 30, and hence the input information acquisition module 101 directly acquires the input image from the user terminal 30. When there is a computer for mediating communication between the business entity server 10 and the user terminal 30, the input information acquisition module 101 may acquire the input image transferred by this computer. That is, the input information acquisition module 101 may indirectly acquire the input image from the user terminal 30.

The input image is an example of input information. Accordingly, the input image as used in the first embodiment can be read as "input information." The input information is information relating to the feature of the outer appearance of the card C possessed by the user. The input information is information input at a time of authentication. The input information corresponds to a query at the time of the authentication. The input information is not limited to an image, and may have any format. For example, the input information may be characters, numerals, or a combination thereof.

The outer appearance of the card C refers to how the card C appears. The feature of the outer appearance is a pictorial feature, a visual feature, an optical feature, or a physical-shape feature, for example, irregularities. The feature refers to a color, darkness, a texture pattern, brightness, a contour, a shape, a size, or a combination thereof. For example, an illustration, a photograph, a texture pattern, a background color, characters, numerals, a logo, a graphic form, a hologram, a physical shape, or a combination thereof, which is included in the card C, corresponds to the feature of the outer appearance of the card C. The physical shape is an uneven shape obtained by an embossing process, or the contour, thickness, or size of the card C.

In the first embodiment, a case in which the front side (card face) of the card C is shown in the input image is described, but the input image may show the back side of the card C, or may show both the front side and the back side of the card C. In addition, the input image is not required to show the entire surface of the card C, and may show only a part of the surface of the card C. In another case, the input image may show the card C of any size and orientation, and may show, for example, the card C photographed at an angle.

[Authentication Module]

The authentication module 102 executes the authentication based on the input image showing the card C possessed by the user and the registered image showing the card C possessed by the user. In the first embodiment, the authentication module 102 executes the authentication based on a result of comparison between the input image and the registered image. This comparison result is a result of determination of similarity or dissimilarity between the input image and the registered image. The similarity-or-dissimilarity determination result indicates any one of a first value meaning similarity or a second value meaning dissimilarity. In theory, the two images can match by coincidence, and hence the similarity in the first embodiment means that the similarity also includes the match.

As a method of determining the similarity or dissimilarity between images, various methods can be used. In the first embodiment, a case of using a learning model described later is described, but another method, for example, cosine similarity, histogram distribution, or template matching (pattern matching), can be used. In the first embodiment, a case in which the overall similarity or dissimilarity between images is determined is described, but the local similarity or dissimilarity between images may be determined.

In the first embodiment, the comparison between the input image and the registered image is executed by a comparison module 204 of the issuer server 20 instead of the authentication module 102 of the business entity server 10. The authentication module 102 acquires a comparison result obtained by the comparison module 204 from the issuer server 20, and executes the authentication. When the input image and the registered image are similar, the authentication is successful. When the input image and the registered image are dissimilar, the authentication fails.

[Registration Module]

The registration module 103 executes registration processing relating to the card C corresponding to the card number based on an execution result of the authentication performed by the authentication module 102. The registration processing is processing for enabling the use of the card C to be registered. In the first embodiment, registering the card C in the app corresponds to the registration processing. In particular, when the app is not used, the registration processing may mean recording the card information on some computer, for example, the business entity server 10.

The card C to be registered is the card C to be registered by the registration processing. The card C to be registered is identified by the card number. In the first embodiment, the card C shown in the input image corresponds to the card C to be registered. In the first embodiment, a case in which the card number of the card C to be registered is acquired from the input image through use of optical character recognition is described, but this card number can be acquired by any method. For example, the user may manually input the card number, or the card number may be stored in the user terminal 30 in advance. In this case, the card number of the card C to be registered is input to the business entity server 10 together with the input image.

The registration module 103 executes the registration processing when the authentication is successful, and does not execute the registration processing when the authentication fails. That is, the success or failure of the authentication is a condition for whether or not to execute the registration processing. When the authentication of a certain user is successful, the registration module 103 executes the registration processing by storing the card information of the card C to be registered into a record of the user database DB1 that corresponds to the user account of the certain user. The user account is input at a time of login. The card information of the card C to be registered is acquired from the issuer server 20.

[1-3-2. Functions Implemented on Issuer Server]

As illustrated in FIG. 4, on the issuer server 20, a data storage unit 200, an input information acquisition module 201, an identification information acquisition module 202, a registered information acquisition module 203, and the comparison module 204 are implemented. The data storage unit 200 is implemented mainly by the storage unit 22. Each of the other functions is mainly implemented by the control unit 21.

[Data Storage Unit]

The data storage unit 200 stores the data required for authentication. For example, a card database DB2 is described for the data storage unit 200.

FIG. 6 is a table for showing a data storage example of the card database DB2. As shown in FIG. 6, the card database DB2 is a database in which card information of the issued card C is stored. For example, the card database DB2 stores a card number, an expiration date, a full name, and a registered image. When a new card C is issued, a new record is created in the card database DB2, and the card information of the new card C is stored.

The card information stored in the card database DB2 may be only the card number, or may include information (for example, a security code or a password in so-called 3-D Secure) other than the information shown in FIG. 6. When the card C is registered in the app, all or part of the card information of the card C stored in the card database DB2 is stored into the user database DB1.

The registered image is registered by the issuer when the card C is issued. In the first embodiment, the issuer photographs the card C from the front in a predetermined size. The guide g10 on the photographing screen G1 shows the guide to the orientation and size at this time. The number of registered images per card C may be a plurality of registered images instead of one. For example, the card C may be photographed from various angles to store a plurality of registered images into the card database DB2.

[Input Information Acquisition Module]

The input information acquisition module 201 acquires the input image input from the user terminal 30. In the first embodiment, the input information acquisition module 201 acquires the input image transferred from the business entity server 10. That is, the input information acquisition module 201 indirectly acquires the input image input from the user terminal 30. The input image may be directly input from the user terminal 30 to the issuer server 20. In this case, the input information acquisition module 201 directly acquires the input image input from the user terminal 30.

[Identification Information Acquisition Module]

The identification information acquisition module 202 acquires the card number of the card C to be registered. The card number is an example of identification information.

Accordingly, the card number as used in the first embodiment can be read as "identification information." The identification information is information that can identify the card C. The identification information may be any information that uniquely identifies the card C, and is not limited to the card number. A combination of a plurality of pieces of information, for example, the card number, the expiration date, and the full name, may correspond to the identification information. As another example of the identification information, an ID corresponding to the card C on a one-to-one basis may correspond to the identification information.

In the first embodiment, the identification information acquisition module 202 acquires the card number from the input image. For example, the identification information acquisition module 202 executes optical character recognition on the input image, to thereby recognize at least one set of characters or numerals included in the input image to acquire the card number. A region in which the card C is shown in the input image may be identified by, for example, extracting the contour.

The optical character recognition may be executed on the entire card C, but the card number is included in a specific region in the card C, and hence the identification information acquisition module 202 executes the optical character recognition on the specific region in the card C shown in the input image. This region may be located at any position, and may have any size and shape. The region is located at, for example, near the center, lower right, or upper left of the card C. It is assumed that information that can identify this region is stored in the data storage unit 200 in advance. The region including the card number may differ depending on a type of the card C, and hence this region may be defined for each type.

As a method itself for recognizing at least one set of characters or numerals from an image, various methods can be used, and the method is not limited to the optical character recognition. For example, a method using a learning model or a method using template matching may be used. In addition, the card number may be acquired by a predetermined method, and is not required to be acquired from the input image. The identification information acquisition module 202 may acquire the card number manually input by the user, or may acquire the card number stored in the user terminal 30.

[Registered Information Acquisition Module]

The registered information acquisition module 203 acquires the registered image registered in association with the card number acquired by the identification information acquisition module 202. In the first embodiment, the registered image is stored in the card database DB2, and hence the registered information acquisition module 203 acquires the registered image from the card database DB2. The registered information acquisition module 203 acquires the registered image stored in the same record as that storing the card number acquired by the identification information acquisition module 202. When the registered image is stored in an external computer or an external information storage medium, the registered information acquisition module 203 may acquire the registered image from the external computer or the external information storage medium.

The registered image is an example of the registered information. The registered image as used in the first embodiment can be read as "registered information." The registered information is information relating to the feature of the outer appearance of the card C, which is registered in the issuer server 20 in advance in association with the card number. The registered information is information to be used as a correct answer at the time of the authentication. The registered information is information corresponding to an index at the time of authentication. The registered information is not limited to an image format, and may have any format. For example, the registered information may be characters, numerals, or a combination thereof. The registered information may be information that can be compared to the input information. The registered information may have the same format as that of the input information, or may have a format different therefrom.

In the first embodiment, a case in which the front side of the card C is shown in the registered image is described, but the registered image may show the back side of the card C, or may show both the front side and the back side of the card C. In addition, the registered image is not required to show the entire surface of the card C, and may show only a part of the surface of the card C. The registered image is only required to show a portion to be utilized for the authentication among portions on both sides of the card C. It suffices that the portion corresponding to the card C shown in the registered image and the portion corresponding to the card C shown in the input image are in common with each other.

[Comparison Module]

The comparison module 204 compares the input image and the registered image to each other. The comparison module 204 determines whether or not the input image and the registered image are similar. That is, the comparison module 204 determines whether or not the card C shown in the input image and the card C shown in the registered image are similar. A similarity degree equal to or higher than a threshold value means similarity, and a similarity degree smaller than the threshold value means dissimilarity.

When each of the input image and the registered image includes a portion other than the card C, the comparison module 204 determines whether or not the region in which the card C is shown in the input image and the region in which the card C is shown in the registered image are similar. That is, after the comparison module 204 removes the portion other than the card C from the input image and removes the portion other than the card C from the registered image, the comparison module 204 determines the similarity or dissimilarity therebetween. Removing the portion other than the card C has the same meaning as that of cutting out the portion of the card C.

When each of the input image and the registered image does not include the portion other than the card C, the comparison module 204 determines whether or not the entire input image and the entire registered image are similar. In this case, the card C is shown in the entire image, and hence it is not required to remove the portion other than the card C. Even when each of the input image and the registered image includes the portion other than the card C, the similarity or dissimilarity therebetween may be determined without removing the portion other than the card C.

In the first embodiment, as described above, as the method of determining the similarity or dissimilarity between images, a method using a learning model is taken as an example. The learning model is a model using machine learning (artificial intelligence). As the machine learning itself, it is possible to use various methods, for example, deep learning or a neural network. That is, as the learning model itself, it is possible to use various models used for determining the similarity or dissimilarity between images.

It is assumed that programs and parameters for the learning model are stored in the data storage unit 200. In this learning model, a large number of pieces of training data being pairs of two images similar to each other are learned.

When two images are input to the learning model, the learning model repeats convolution and pooling to calculate a feature amount of each image. The feature amount is expressed by a multidimensional vector.

The learning model calculates a distance between two feature amounts in a vector space. This distance corresponds to a similarity degree between the two images. The similarity degree becomes higher as the distance becomes shorter, and becomes lower as the distance becomes longer. The similarity degree is a score indicating the degree of similarity. A probability that the two images are similar becomes higher as the similarity degree becomes higher, and becomes lower as the similarity degree becomes lower. This probability is also called "probability" or "likelihood."

When the distance between the two feature amounts is smaller than the threshold value, the learning model outputs the first value meaning that the two images are similar to each other. When this distance is smaller than the threshold value, the learning model outputs the second value meaning that the two images are dissimilar to each other. The output of the learning model is a determination result indicating whether or not the two images are similar. This output can also be said to be a label meaning whether or not the two images are similar.

The comparison module 204 inputs a pair of the input image acquired by the input information acquisition module 101 and the registered image acquired by the registered information acquisition module 203 into the learning model. The learning model outputs a determination result indicating whether or not the input image and the registered image are similar. The comparison module 204 transmits, as the comparison result, the determination result output from the learning model, to the business entity server 10.

The learning model may output the similarity degree instead of the similarity-or-dissimilarity determination result. In this case, the comparison module 204 determines whether or not the input image and the registered image are similar by determining whether or not the similarity degree output from the learning model is equal to or higher than the threshold value. The comparison module 204 transmits, as the comparison result, the similarity-or-dissimilarity determination result determined based on the similarity degree output from the learning model to the business entity server 10.

In another case, the comparison module 204 may transmit, as the comparison result, the similarity degree between the input image and the registered image to the business entity server 10 instead of the similarity-or-dissimilarity determination result. In this case, the authentication module 102 of the business entity server 10 executes the authentication by determining whether or not the similarity degree received from the issuer server 20 is equal to or higher than the threshold value. When the similarity degree is equal to or higher than the threshold value, the authentication is successful. When the similarity degree is lower than the threshold value, the authentication fails.

[1-3-3. Functions Implemented on User Terminal]

As illustrated in FIG. 4, on the user terminal 30, a data storage unit 300, a display control module 301, and a reception module 302 are implemented. The data storage unit 300 is implemented mainly by the storage unit 32. Each of the display control module 301 and the reception module 302 is implemented mainly by the control unit 31. The data storage unit 300 stores data required for processing described in the first embodiment. For example, the data storage unit 300 stores a transportation-related app. The display control module 301 causes the display unit 35 to display each screen described with reference to FIG. 2 based on the app. The reception module 302 receives the user's operation on each screen.

[1-4. Processing to be Executed in First Embodiment]

Figure 7:
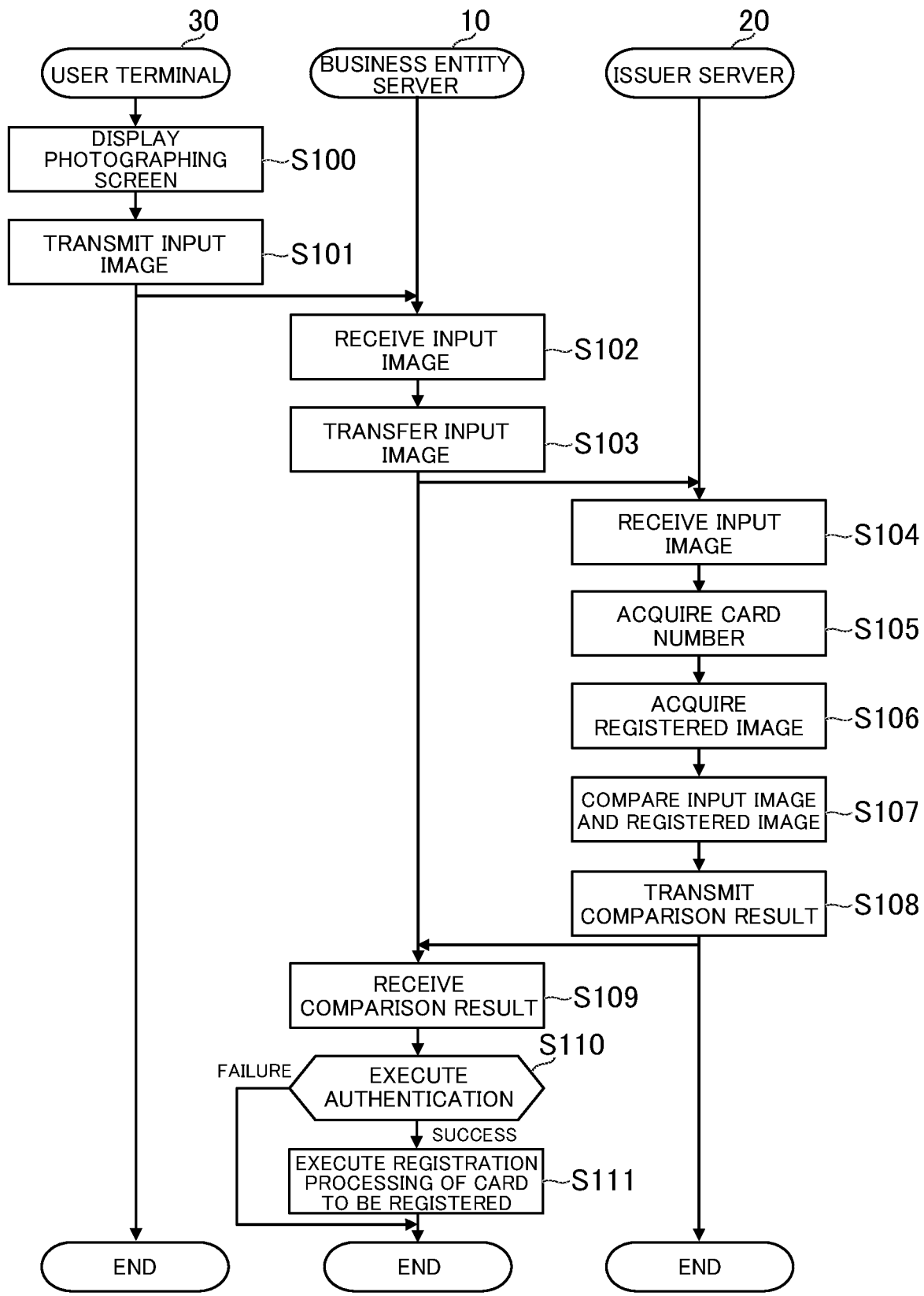
FIG. 7 is a flow chart for illustrating an example of processing to be executed in the first embodiment.

FIG. 7 is a flow chart for illustrating an example of processing to be executed in the first embodiment. The processing illustrated in FIG. 7 is executed by the control units 11, 21, and 31 operating in accordance with the programs stored in the storage units 12, 22, and 32, respectively. This processing is an example of processing to be executed by the functional blocks illustrated in FIG. 4. This processing is executed when the app of the user terminal 30 is activated and an operation for registering the card C is performed from a predetermined menu.

As illustrated in FIG. 7, the user terminal 30 activates the photographing unit 36 to display the images continuously photographed by the photographing unit 36 on the photographing screen G1 (Step S100). When the user, for example, taps the photographing screen G1, the user terminal 30 causes the photographing unit 36 to photograph the card C to generate an input image, and transmits the input image to the business entity server 10 (Step S101). The user has already logged in to the app, and the user account of the user is also transmitted to the business entity server 10.

When the business entity server 10 receives the input image from the user terminal 30 (Step S102), the business entity server 10 transfers the input image to the issuer server 20 (Step S103). When the issuer server 20 receives the input image from the business entity server 10 (Step S104), the issuer server 20 subjects the input image to the optical character recognition to acquire the card number (Step S105). The issuer server 20 refers to the card database DB2 to acquire the registered image associated with the card number acquired in Step S105 (Step S106).

The issuer server 20 compares the input image received in Step S104 and the registered image acquired in Step S106 to each other (Step S107), and transmits the comparison result to the business entity server 10 (Step S108). In Step S107, the issuer server 20 inputs the input image and the registered image into the learning model, and acquires the similarity-or-dissimilarity determination result output from the learning model. In Step S108, the issuer server 20 transmits, as the comparison result, the determination result output from the learning model. It is assumed that this comparison result includes the card number acquired in Step S105.

When the business entity server 10 receives the comparison result from the issuer server 20 (Step S109), the business entity server 10 refers to the comparison result to execute the authentication (Step S110). When the comparison result indicates the similarity and the authentication is successful ("success" in Step S110), the business entity server 10 executes the registration processing of the card C to be registered (Step S111), and this process ends.

In Step S111, the business entity server 10 registers the card information of the card C to be registered in the user database DB1 in association with the user account of the user. This card information may be included in the comparison result obtained in Step S109, or may be acquired from the issuer server 20 in Step S111. The business entity server 10 transmits the display data of the success screen G2 to the user terminal 30, and the success screen G2 is displayed.

Meanwhile, when the authentication fails due to the comparison result not indicating the similarity ("failure" in Step S110), the processing step of Step S111 is not executed, and this process ends. In this case, in the user database DB1, the card information of the card C to be registered is not registered in the user database DB1. The business entity server 10 transmits the display data of the failure screen G3 to the user terminal 30, and the failure screen G3 is displayed.

According to the authentication system S of the first embodiment, the authentication is executed based on the input image and the registered image associated with the card number of the card C to be registered, to thereby enhance the security in possession authentication utilizing the card C. In addition, a malicious third party dislikes his or her face included in the photograph for some reason, and hence requesting the card C to be photographed can pose a psychological barrier. In another regard, card information including a card number may be registered in various servers, and can be said to be information relatively accessible to a malicious third party. Meanwhile, the registered image is registered only in the issuer server 20 without being registered in other servers, and hence cannot be obtained by a third party in principle. Accordingly, even when a third party illegally obtains the card information, the feature of the outer appearance of the card C cannot be identified in principle unless the card C itself is stolen. In view of this, the authentication is executed by utilizing the feature of the outer appearance of the card C, to thereby be able to prevent unauthorized registration from being performed by a third party who has illegally obtained the card information. For example, authentication involving input of a security code of the card C is also generally called possession authentication, but the possession authentication in the first embodiment cannot be successful only based on knowledge of the security code or other such information, and hence it is possible to achieve robust possession authentication in terms of security. In the same manner, when each of the input information and the registered information is information other than an image, a third party cannot know the feature of the outer appearance of the card C in principle, and hence the security in possession authentication is enhanced.

Further, in the authentication system S, the issuer server 20 executes the comparison between the input image and the registered image, and the business entity server 10 acquires the comparison result from the issuer server 20 to execute the authentication, to thereby eliminate requirement for management of the registered image on the business entity server 10 and prevent the registered image from being transmitted on the network N. Accordingly, the registered image being confidential information is less liable to be leaked, to thereby be able to effectively enhance the security. In addition, the processing required for the authentication is shared between the business entity server 10 and the issuer server 20, to thereby be able to distribute processing loads at the time of the authentication.

Further, in the authentication system S, the registration processing relating to the card C corresponding to the card number is executed based on the execution result of the authentication, to thereby enhance the security at the time of the registration of the card C. That is, it is possible to prevent unauthorized registration from being performed by a third party who has illegally obtained the card information.

2. Second Embodiment

Next, an authentication system S according to a second embodiment of the present disclosure is described. In the second embodiment, a case in which the comparison between the input image and the registered image is executed not by the issuer server 20 but by the business entity server 10 is described. In the same manner as in the first embodiment, the registered image is registered in the issuer server 20. The same points as those of the first embodiment are omitted from the following description.

Figure 8:
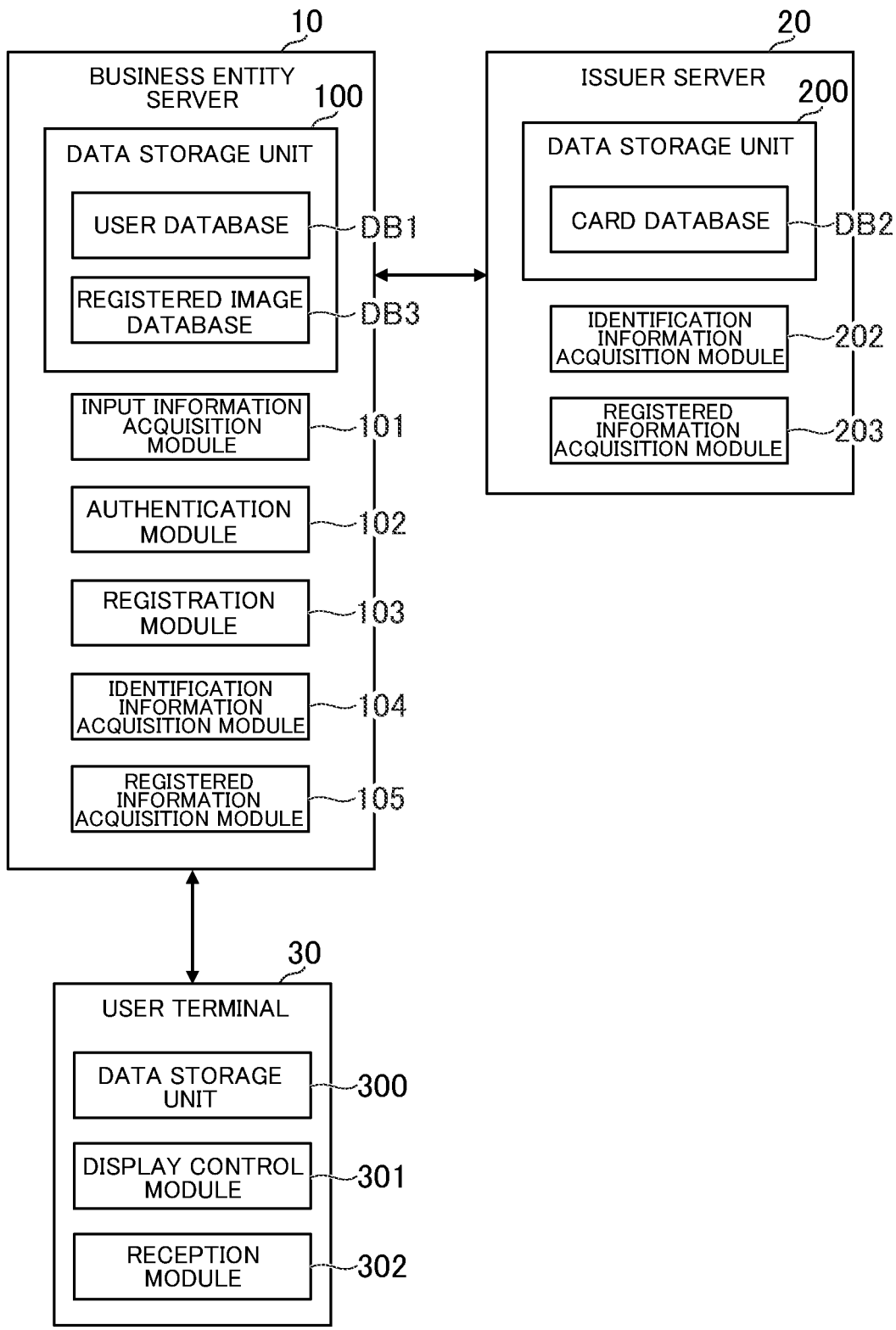
FIG. 8 is a functional block diagram in a second embodiment of the present disclosure.

FIG. 8 is a functional block diagram in the second embodiment. As illustrated in FIG. 8, the business entity server 10 includes the data storage unit 100, the input information acquisition module 101, the authentication module 102, the registration module 103, an identification information acquisition module 104, and a registered information acquisition module 105. Each of the identification information acquisition module 104 and the registered information acquisition module 105 is implemented mainly by the control unit 11. The function of the comparison module 204 described in the first embodiment is incorporated in the authentication module 102, and hence the comparison module 204 is not shown in FIG. 8. In addition, the input information acquisition module 201 can be omitted.

The data storage unit 100 in the second embodiment stores a registered image database DB3. The registered image database DB3 is a database for storing at least a pair of the card number and the registered image that are included in the card database DB2 described in the first embodiment. The registered image database DB3 corresponds to the card number and the registered image that are included in the card database DB2 of FIG. 6, and hence illustration thereof is omitted.

Processing itself of the identification information acquisition module 104 is the same as that of the identification information acquisition module 202 in the first embodiment. For example, the identification information acquisition module 104 acquires the card number from the input image acquired by the input information acquisition module 101 through use of the optical character recognition. Processing of the registered information acquisition module 105 is also substantially the same as that of the registered information acquisition module 203 in the first embodiment, but the registered information acquisition module 105 acquires the registered image from the issuer server 20.

For example, the registered information acquisition module 105 stores the registered image acquired from the issuer server 20 into the registered image database DB3. Each time the issuer server 20 issues the card C, the issuer server 20 transmits the card number and the registered image to the business entity server 10. When the business entity server 10 receives the card number and the registered image, the registered information acquisition module 105 stores a pair of those into the registered image database DB3. The registered image database DB3 may store all the card numbers and registered images in the card database DB2, or may store a part of the card numbers and registered images.

The registered information acquisition module 105 may acquire the registered image at the time of the authentication instead of storing the registered image in the registered image database DB3 in advance. For example, when the card number is acquired by the identification information acquisition module 104, the registered information acquisition module 105 may request the issuer server 20 for the registered image of the card C indicated by the card number. The issuer server 20 acquires the registered image from the card database DB2, and transmits the registered image to the business entity server 10. The registered information acquisition module 105 acquires the registered image transmitted by the issuer server 20. In this manner, the registered image is dynamically acquired at the time of the authentication, to thereby eliminate requirement for the business entity server 10 to store the registered image database DB3.

Figure 9:
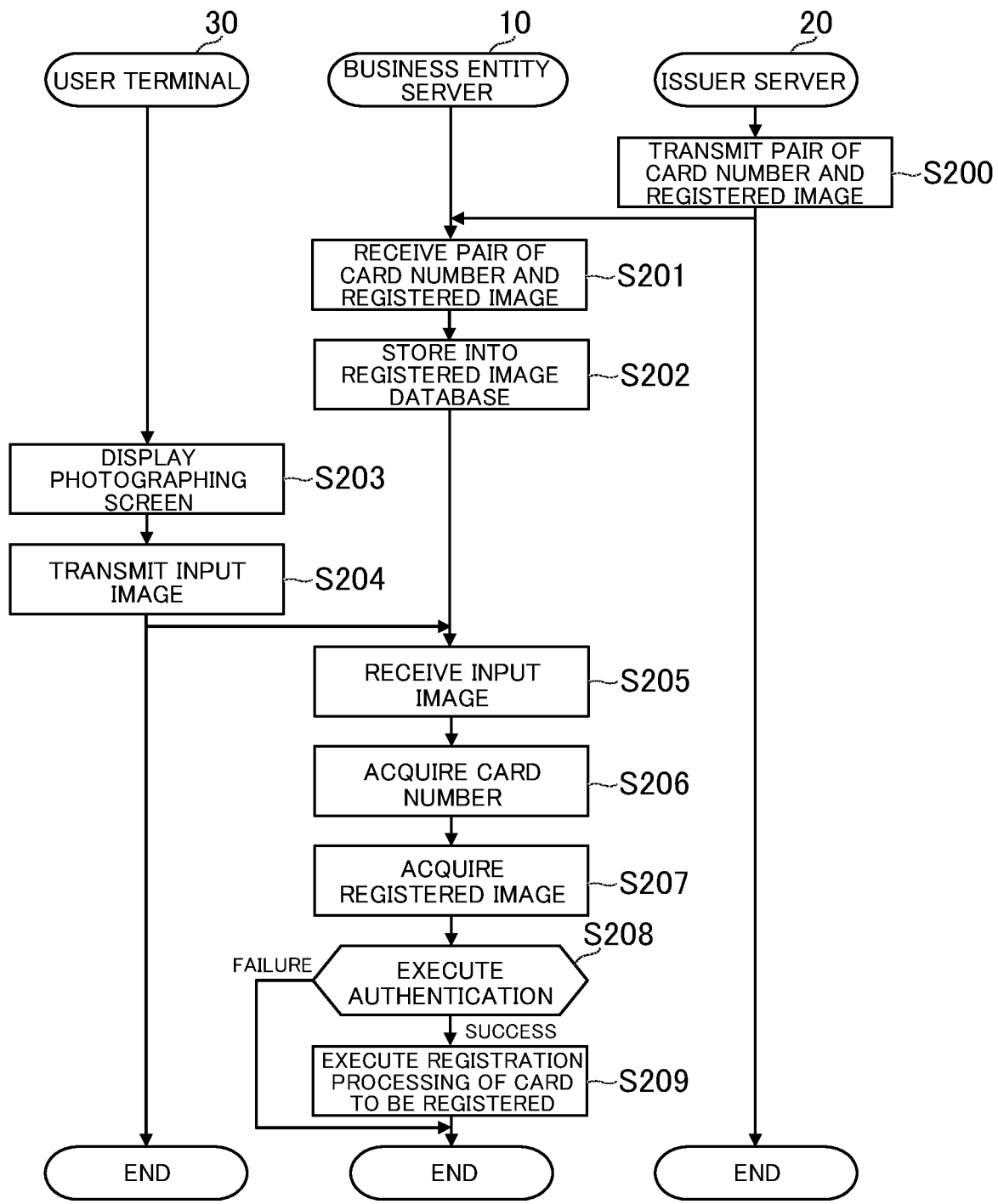
FIG. 9 is a flow chart for illustrating an example of processing to be executed in the second embodiment.

FIG. 9 is a flow chart for illustrating an example of processing to be executed in the second embodiment. As illustrated in FIG. 9, when a new card C is issued and added to the card database DB2, the issuer server 20 transmits the pair of the card number and the registered image to the business entity server 10 (Step S200). When the business entity server 10 receives the pair of the card number and the registered image (Step S201), the business entity server 10 stores the received pair into the registered image database DB3 (Step S202). The subsequent processing steps of from Step S203 to Step S205 are the same as the processing steps of from Step S100 to Step S102.

The business entity server 10 performs the optical character recognition on the input image received in Step S205 to acquire the card number (Step S206). The business entity server 10 refers to the registered image database DB3 to acquire the registered image associated with the card number acquired in Step S206 (Step S207). The business entity server 10 executes the authentication by comparing the input image and the registered image to each other (Step S208). The processing step of Step S208 is the same as the processing step of Step S110 executed after the processing step of Step S107 executed by the business entity server 10. The subsequent processing step of Step S209 is the same as that of Step S111.

According to the second embodiment, the business entity server 10 executes the authentication by comparing the input image and the registered image to each other, to thereby eliminate requirement to cause the communication between the business entity server 10 and the issuer server 20 after the input image is input, and hence it is possible to speed up the authentication. In addition, the issuer server 20 does not execute the comparison between the input image and the registered image, and hence it is possible to reduce a processing load on the issuer server 20.

3. Modification Examples

The present disclosure is not limited to the embodiments described above, and can be modified suitably without departing from the spirit of the present disclosure.

Figure 10:
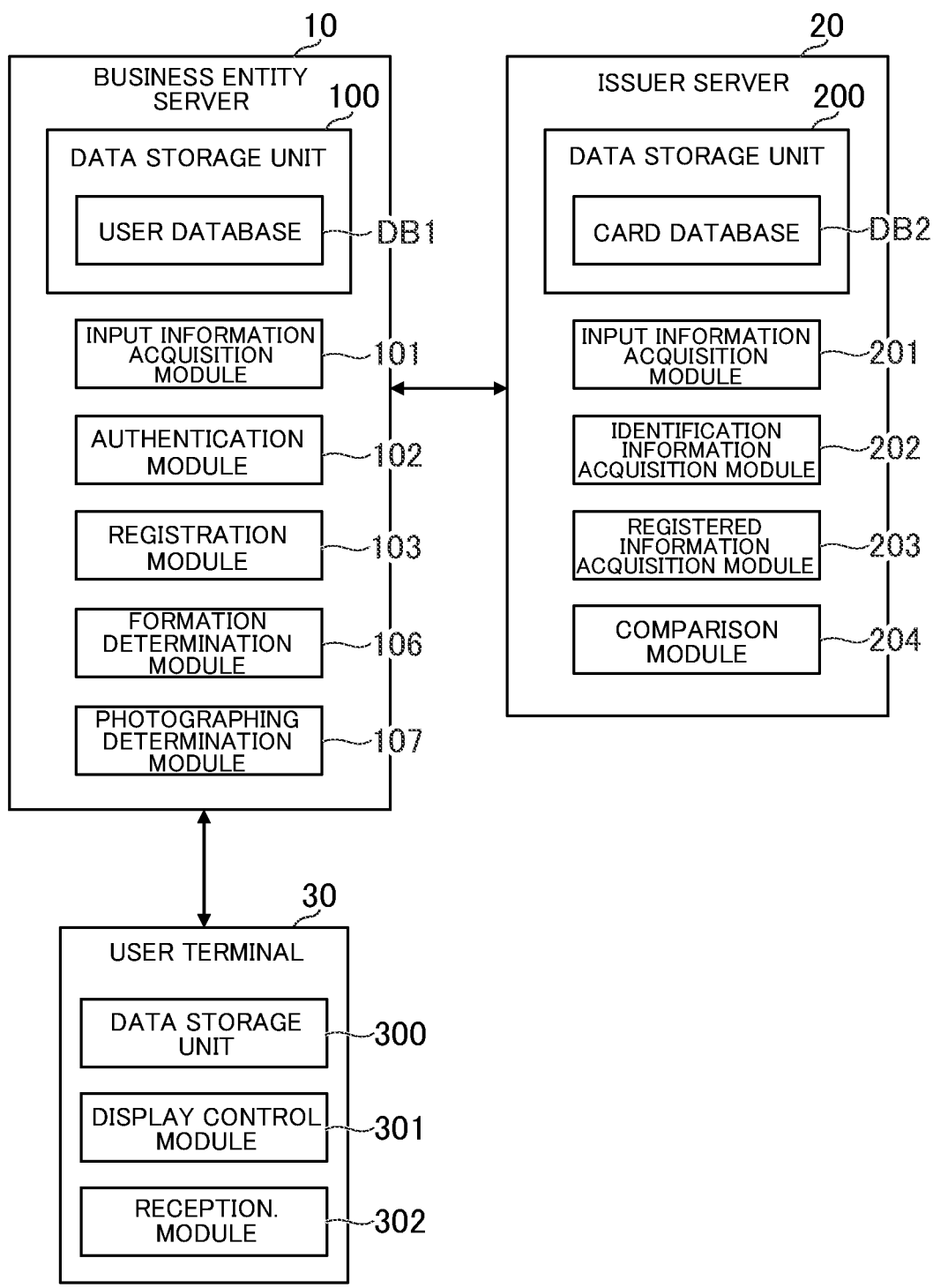
FIG. 10 is a functional block diagram in modification examples of the present disclosure.

FIG. 10 is a functional block diagram in modification examples of the present disclosure. As illustrated in FIG. 10, in the modification examples described below, in addition to the functions described in the embodiments, a formation determination module 106 described in Modification Example (7) of the present disclosure and a photographing determination module 107 described in Modification Example (8) of the present disclosure are implemented. Each of those functions is implemented mainly by the control unit 11. In FIG. 10, the formation determination module 106 and the photographing determination module 107 are added to the functional blocks of the first embodiment. However, the formation determination module 106 and the photographing determination module 107 may be added to the functional blocks of the second embodiment.

(1) For example, in each of the first embodiment and the second embodiment, the case in which the authentication is executed based on the feature of the outer appearance of the entire card C has been described, but the authentication may be executed with attention being given to a design of a background of the card C. The card C in each of the first embodiment and the second embodiment includes the background, and hence the design of the background is resultantly taken into consideration for the similarity-or-dissimilarity determination even in the case of determining the overall similarity or dissimilarity between the card C shown in the input image and the card C shown in the registered image. However, in this modification example, the authentication that gives more attention to the design of the background is described.

In this embodiment, the feature of the outer appearance of the card C is the design of the background of the card C, and the authentication module 102 executes the authentication based on a design of a background shown in the input image and a design of a background shown in the registered image. When those designs of the backgrounds are similar, the authentication is successful. When those designs of the backgrounds are dissimilar, the authentication fails.

The background is a portion other than a foreground. The background is a portion in a back layer (or on a lower side or back side) of the foreground. The background is a portion hidden behind the foreground. The background is a portion of the surface of the card C other than the card information. The foreground is a portion in a front layer (or on an upper side or front side) of the background. The foreground is a portion that hides the background. The foreground is a portion that overlaps with the background. The foreground is a portion indicating the card information on the surface of the card C.

When the user uses the physical card C instead of the app, a portion of which the other party is unaware corresponds to the background, and a portion to be examined by the other party corresponds to the foreground. Information other than the card information registered in the business entity server 10 may correspond to the foreground. In a portion of the card C in which the foreground and the background overlap with each other, the foreground appears with priority over the background. In this portion, only the foreground may appear with the background being hidden completely, or the foreground may appear in a state darker than the background.

For example, the background is an illustration, a photograph, a graphic form, a texture pattern, a motif pattern, a color, or a combination thereof. The background may appear entirely on the card C, or may appear locally on a part of the card C. In the example of FIG. 3, the illustration i10 corresponds to the background. The IC chip c14 having the card information stored in an inside thereof corresponds to the background because an appearance thereof is not meaningful as the card information. The texture pattern of the IC chip c14 may have a plurality of patterns. A portion of the card C denoted by no reference symbol also has some color in actuality, and thus corresponds to the background.

In the example of FIG. 3, each of the card name n11, the marks m12 and m13, the hologram h15, the card number n16, the expiration date e17, the issue date d18, and the full name n19 exists over the background, and thus corresponds to the foreground. Those portions of the foreground are characters, numerals, graphic forms, logos, or a combination thereof. In addition, as a part of the background, characters, numerals, a graphic form, a logo, or a combination thereof may be included.

FIG. 11 is a view for illustrating an example of authentication performed with attention being given to the design of the background of the card C. As illustrated in FIG. 11, in this modification example, foreground portions of the card C in the input image I are masked. For example, in the method using the learning model, even when attention is to be given only to the design of the background, the method may be affected by features of the foreground when the input image I includes the foreground. In view of this, in this modification example, the features of the foreground are eliminated or reduced by masking.

The masking itself can be executed by various kinds of mask processing. For example, processing of filling with a predetermined color, for example, white or black, processing of filling with a surrounding (background) color, or blurring processing is an example of the mask processing. It is assumed that a portion to be masked in the card C is defined in advance. The portion to be masked may differ depending on the type of the card C, and hence, in this case, it is assumed that a portion to be masked is defined for each type of the card C. It is assumed that the type of the card C is stored in the card database DB2. It is assumed that data indicating the portion to be masked is stored in advance in the business entity server 10 or the issuer server 20.

When the flow of the first embodiment is taken as an example, the comparison module 204 masks the foreground portions defined in advance, with respect to the input image I. It is assumed that the foreground portions of the registered image are masked in advance, but the comparison module 204 may mask the foreground portions of the registered image on the spot. The portion to be masked in the input image I and the portion to be masked in the registered image are the same. Those are not required to match perfectly, and some deviation may be allowed. The comparison module 204 compares the input image I having the foreground portions masked and the registered image having the foreground portions masked to each other. The method itself of comparing those to each other is as described in the first embodiment. The flow in which the authentication module 102 acquires the comparison result from the comparison module 204 and executes the authentication is also as described in the first embodiment. In the case of the flow of the second embodiment, the authentication module 102 may execute the masking on the input image I. The authentication module 102 may execute the authentication by comparing the input image I having the foreground portions masked and the registered image having the foreground portions masked to each other.

In the example of FIG. 11, a case in which the masking is executed so that only the illustration i10 remains is described. However, a pattern on the surface of the IC chip c14 can also be utilized as a feature of the background, and hence the IC chip c14 may remain without being masked. In another case, not all the portions of the foreground are required to be masked, and a small feature in the foreground may remain without being masked.

In addition, a method for giving attention to the design of the background is not limited to the masking. It is possible to employ various kinds of image processing that can eliminate or reduce the features of the foreground. For example, a background portion may be cut out from the input image I. In this case, not the entire background portion but only a partial portion having, for example, a characteristic texture pattern may be cut out.

FIG. 12 is a view for illustrating an example of the authentication performed with attention being given to the design of the background of the card C. As illustrated in FIG. 12, it is assumed that a portion to be cut out in the card C is defined in advance. The portion to be cut out may differ depending on the type of the card C, and hence, in this case, it is assumed that a portion to be cut out is defined for each type of the card C. It is assumed that data indicating the portion to be cut out is stored in advance in the business entity server 10 or the issuer server 20. In FIG. 12, the input image I is set to have the same size between before and after the background is cut out, but the size of the input image I obtained after the background is cut out may be smaller.

The comparison module 204 compares the input image I having the background portion cut out and the registered image having the background portion cut out to each other. The method itself of comparing those to each other is as described in the first embodiment. The flow in which the authentication module 102 acquires the comparison result from the comparison module 204 and executes the authentication is also as described in the first embodiment. In the case of the flow of the second embodiment, the authentication module 102 may execute the cutout of the background portion of the input image I. The authentication module 102 may execute the authentication by comparing the input image I having the background portion cut out and the registered image having the background portion cut out to each other.

According to Modification Example (1) of the present disclosure, it is possible to effectively enhance the security in possession authentication by executing the authentication based on the design of the background shown in the input image and the design of the background shown in the registered image. For example, when a third party illegally obtains the card information, the issuer may be identified by a predetermined digit of the card number. In this case, it is conceivable that the third party may attempt unauthorized registration through use of a composite image obtained by combining the illegally obtained card information with a sample image provided on a website of the issuer. However, the cards C of the issuer often have a large number of designs including the designs issued in the past, and the third party cannot identify the design of an actual card C based on the card information alone. Accordingly, the design of the background of the card C is utilized for the authentication, to thereby be able to achieve robust possession authentication in terms of security.

In each of the first embodiment and the second embodiment, the case in which the registered image is stored in the card database DB2 for each user has been described, but the users using the cards C having the same background can share a registered image showing the above-mentioned background, and hence the registered image is not required to be stored for each user. In this registered image, only the background portion of the card C is shown. When there are a plurality of types of backgrounds, the type of the background may be associated with the card number in the card database DB2. In this case, a registered image exists for each type of the background, and the registered image of the type of the background associated with the card number of the card C to be registered is utilized for the authentication. Thus, it is not required to prepare a registered image for each user, and it is possible to reduce a memory consumption amount of the issuer server 20.

(2) Further, for example, the case in which the background is an illustration has been described, but the background may be a photograph. Any subject may be captured in the photograph, and, for example, an athlete, a singer, a car, a landscape, or a building may be captured therein. The authentication may be executed with attention being given to the photograph as the design of the background. In this modification example, a case in which the background is an illustration or photograph on the card C is described.

For example, the authentication module 102 executes the authentication based on a design of an illustration or photograph shown in the input image and a design of an illustration or photograph shown in the registered image. When the designs of the illustrations or photographs of the backgrounds are similar, the authentication is successful.

When the designs of the illustrations or photographs of the backgrounds are dissimilar, the authentication fails.

The processing itself at the time of the authentication is the same as that of Modification Example (1), and the masking of the foreground may be executed, or the cutout of a portion corresponding to the illustration or photograph of the background may be executed. In the same manner as in the first embodiment and the second embodiment, even when the overall similarity or dissimilarity between the input image and the registered image is determined, the design of the illustration or photograph of the background is resultantly taken into consideration for the similarity-or-dissimilarity determination. However, the masking or cutout is executed, to thereby enable more attention to be given to the design of the illustration or photograph.

According to Modification Example (2) of the present disclosure, it is possible to effectively enhance the security in possession authentication by executing the authentication based on the design of the illustration or photograph shown in the input image and the design of the illustration or photograph in the registered image. For example, as the illustration or photograph of the card C, new ones are likely to be issued, and there are a large number of designs. Accordingly, the illustration or photograph of the background is information that is more difficult for a third party to identify. When there are a large number of designs, it is extremely time-consuming for the third party to create composite images on a round-robin system, to thereby increase the possibility that the third party gives up committing a fraud. As a result, it is possible to achieve more robust security.

(3) For example, when there are a plurality of types of designs of the backgrounds in the cards C of the same type, a condition of whether or not the types of designs match may be set as a condition for the authentication. The cards C of the same type indicate that the issuers of the cards C are the same and the series of the cards C issued by the issuer are the same. The cards C having an electronic money function or another such function in common may correspond to the cards C of the same type.

For example, the fact that the illustrations of the backgrounds of the cards C include the same character but the character has different appearances corresponds to the same series. In addition, for example, the fact that different characters appearing in the same story are included in the backgrounds of the cards C corresponds to the same series. In addition, for example, the fact that the photographs of the backgrounds of the cards C include the same person being the subject but the person has different poses and facial expressions corresponds to the same series.

The authentication module 102 in this modification example executes the authentication based on a type of the design of the background shown in the input image and a type of the design of the background shown in the registered image. When those types of the designs of the backgrounds match, the authentication is successful. When those types of the designs of the backgrounds do not match, the authentication fails. In this modification example as well, the same masking or cutout as in Modification Example (1) may be executed, to thereby execute the authentication with attention being given to the type of the design in the same series.

For example, even in the series of cards C on which the same dog character as in FIG. 3 is drawn, when the clothes and facial expressions of the dog are different, the authentication is not successful. In addition, for example, even when the cards C are of the same series, the design may change depending on the issuance timing. Even in the series of cards C on which a certain comic book character is drawn, the design may change between the card C issued in 2018 and the card C issued in 2020. The authentication module 102 may execute the authentication with attention being given to the difference between those types of the designs. The authentication itself may be executed based on the similarity or dissimilarity of the image of the background portion to which attention is to be given.

According to Modification Example (3) of the present disclosure, when there are a plurality of types of designs of the backgrounds in the cards C of the same type, the authentication is executed based on the type of the design of the background shown in the input image and the type of the design of the background shown in the registered image, to thereby be able to effectively enhance the security in possession authentication. For example, even when a third party illegally obtains the card information, it is extremely difficult to further identify the type of the design in the same series, and hence it is possible to achieve more robust security.

(4) Further, for example, the feature of the outer appearance to be utilized for the authentication may be the design of the foreground of the card C. In this modification example, a case in which the size and font of the card number n16 of FIG. 3 are utilized as the design of the foreground is described, but another design of the foreground can be utilized. For example, the size, color, and font of the card name n11, the sizes, colors, and shapes of the marks m12 and 13, the size, color, and shape of the hologram h15, the size, color, and font of the issue date d18, or the size, color, and font of the full name n19 may be utilized for the authentication. Further, for example, the presence or absence of those portions of the foreground or the number thereof may be utilized for the authentication.

The authentication module 102 in this modification example executes the authentication based on the design of the foreground shown in the input image and the design of the foreground shown in the registered image. When those designs are similar, the authentication is successful. When those designs are dissimilar, the authentication fails. The card C in each of the first embodiment and the second embodiment also includes the design of the foreground, and hence the design of the foreground is resultantly taken into consideration for the similarity-or-dissimilarity determination even in the case of determining the overall similarity or dissimilarity between the card C shown in the input image and the card C shown in the registered image. However, in this modification example, the authentication that gives more attention to the design of the foreground is described.

FIG. 13 is a view for illustrating an example of authentication performed with attention being given to the design of the foreground of the card C. As illustrated in FIG. 13, in this modification example, a portion of the input image I other than the card number n16 of the card C is masked. For example, in the method using the learning model, even when attention is to be given only to the design of the card number n16, the method may be affected by features of the other portion when the input image I includes the other portion. In view of this, in this modification example, the features of the other portion are eliminated or reduced by masking.

The masking itself is as described in Modification Example (1), and it is assumed that the portion to be masked in the card C is defined in advance. When the flow of the first embodiment is taken as an example, the comparison module 204 masks the portion other than the card number n16 with respect to the input image I. It is assumed that the other portion of the registered image is masked in advance, but the comparison module 204 may mask the other portion of the registered image on the spot.

The comparison module 204 compares the input image I having the other portion masked and the registered image having the other portion masked to each other. The method itself of comparing those to each other is as described in the first embodiment. The flow in which the authentication module 102 acquires the comparison result from the comparison module 204 and executes the authentication is also as described in the first embodiment. In the case of the flow of the second embodiment, the authentication module 102 may execute the masking on the input image I. The authentication module 102 may execute the authentication by comparing the input image I having the other portion masked and the registered image having the other portion masked to each other.

FIG. 14 is a view for illustrating an example of the authentication performed with attention being given to the design of the foreground of the card C. As illustrated in FIG. 14, in the same manner as in Modification Example (1), the card number n16 may be cut out instead of being masked. The portion to be cut out is also defined in advance in the same manner as in Modification Example (1).

The input image I having the card number n16 cut out and the registered image having the card number n16 cut out may be compared to each other. In this case, the issuer server 20 is not required to register the image of the entire surface of the card C as the registered image, and is only required to register the image of a local foreground. For example, the image of only a logo or a number portion may be stored in the card database DB2 as the registered image.

According to Modification Example (4) of the present disclosure, the design of the foreground of the card C is utilized as the feature of the outer appearance, and the authentication is executed based on the design of the foreground shown in the input image and the design of the foreground shown in the registered image, to thereby be able to effectively enhance the security in possession authentication. For example, even when a third party illegally obtains the card information, the card information does not further include the design, and hence it is impossible to further identify the design of the foreground, to thereby be able to achieve more robust security.

(5) Further, for example, when there are a plurality of types of designs of the foregrounds in the cards C of the same type, a condition of whether or not the types of designs match may be set as a condition for the authentication. The meaning of the cards C of the same type is as described in Modification Example (3). In this modification example, the marks m12 and m13 are each described as an example of the design of the foreground.

The authentication module 102 executes the authentication based on a type of the design of the foreground shown in the input image and a type of the design of the foreground shown in the registered image. When those types match, the authentication is successful. When those types do not match, the authentication fails. In this modification example as well, the same masking or cutout as in Modification Example (4) may be executed, to thereby execute the authentication with attention being given to the type of the design in the same series.

For example, the marks m12 and m13 may indicate an electronic money function or another such function possessed by the card C. Even when this function itself does not change, the marks m12 and m13 may change. In the same manner for another portion of the foreground, even with the same issuer, the design of the hologram h15 or another logo may change. For example, the design of the hologram h15 or another logo may change between the card C issued in 2018 and the card C issued in 2020. The authentication module 102 may execute the authentication with attention being given to the difference between those types of the designs. The authentication itself may be executed based on the similarity or dissimilarity of the image of the foreground portion to which attention is to be given.

According to Modification Example (5) of the present disclosure, when there are a plurality of types of designs of the foregrounds in the cards C of the same type, the authentication is executed based on the type of the design of the foreground shown in the input image and the type of the design of the foreground shown in the registered image, to thereby be able to effectively enhance the security in possession authentication. For example, even when a third party illegally obtains the card information, it is extremely difficult to further identify the type of the design of the foreground in the same series, and hence it is possible to achieve more robust security.

(6) Further, for example, even when the foregrounds have a portion having the same appearance, the portion may be in the lower right or upper left instead of the upper right depending on the type of the card C and the issuance timing. In view of this, the feature of the outer appearance to be utilized for the authentication may be the position of the portion of the foreground of the card C. That is, not only the appearances of the marks m12 and m13 or other portions of the foreground but also arrangement thereof in the card C may be taken into consideration for the authentication. In this modification example, a case in which the position of each of a plurality of portions of the foreground is utilized for the authentication is described, but only the arrangement position of one portion of the foreground may be utilized for the authentication.

The authentication module 102 may execute the authentication based on the position of each portion of the foreground shown in the input image and the position of each portion of the foreground shown in the registered image. When those positions match, the authentication is successful. When those positions do not match, the authentication fails. In this modification example as well, the same masking or cutout as in Modification Example (4) may be executed, to thereby execute the authentication with attention being given to the position of the portion of the foreground.

For example, the authentication module 102 executes the authentication by determining whether or not a positional relationship between a plurality of portions of the foreground in the input image and a positional relationship between a plurality of portions of the foreground shown in the registered image match. When those positional relationships match, the authentication is successful. When those positional relationships do not match, the authentication fails. Even with the same appearances of the marks m12 and m13 or other portions of the foreground, when the positions thereof are different, the authentication is not successful.

The authentication module 102 may determine whether or not the above-mentioned positional relationships match not based on the similarity or dissimilarity between the images but based on coordinates indicating the positions of the portions of the foreground in each of the images. For example, the authentication module 102 may identify the coordinates at which each of the marks m12 and m13 is located in the input image, and may determine that the positional relationships match when a deviation from the coordinates at which each of the marks m12 and m13 is located in the registered image is smaller than a threshold value.

According to Modification Example (6) of the present disclosure, the position of each portion of the foreground of the card C is utilized as the feature of the outer appearance, and the authentication is executed based on the position of each portion of the foreground shown in the input image and the position of each portion of the foreground shown in the registered image, to thereby be able to effectively enhance the security. For example, even when a third party illegally obtains the card information, the card information does not further include the arrangement of the portions of the foreground, and hence it is impossible to further identify the arrangement of the portions of the foreground, to thereby be able to achieve more robust security.

(7) Further, for example, a malicious third party may obtain a paper sheet on which the card C has been copied. In this case, there is a fear in that the third party photographs the paper sheet and inputs the photograph as the input image, and hence it may be determined whether or not the card C captured in the input image is the card C that has been formed on the paper sheet.

The authentication system S according to this modification example includes the formation determination module 106. The formation determination module 106 determines whether or not the input image shows a paper sheet on which the image of the card C has been formed. That is, the formation determination module 106 determines whether the input image is an input image in which the real card C has been photographed or an input image in which the paper sheet on which the image of the real card C had been formed has been photographed.

In this modification example, a case in which the formation determination module 106 executes determination processing based on a degree of light reflection exhibited by the hologram h15 portion is described. The formation determination module 106 calculates an average value of brightness of the hologram h15 portion in the input image, and determines whether or not the average value is equal to or larger than a threshold value. When the average value is equal to or larger than the threshold value, it is determined that the paper sheet is not shown (the real card C is shown). When the average value is smaller than the threshold value, it is determined that the paper sheet is shown.

The determination method to be used by the formation determination module 106 is not limited to the above-mentioned example. For example, the pattern matching may be executed by cutting out only the hologram h15 portion of each of the input image and the registered image. In another case, for example, a plurality of input images may be generated by causing the user to photograph the card C from a plurality of angles, and the formation determination module 106 may identify a thickness of the card C by image analysis and determine whether or not the thickness is equal to or larger than a threshold value. When the thickness is equal to or larger than the threshold value, it is determined that the paper sheet is not shown (the real card C is shown). When the thickness is smaller than the threshold value, it is determined that the paper sheet is shown.

The authentication module 102 further executes the authentication based on the determination result obtained by the formation determination module 106. When it is determined that the paper sheet on which the card C has been formed is not shown in the input image and the input image and the registered image are similar, the authentication is successful. When it is determined that the paper sheet on which the card C has been formed is shown in the input image, or when the input image and the registered image are not similar, the authentication fails. That is, in this modification example, there are two conditions for successful authentication, and satisfying both the two conditions is the condition for successful authentication. When even at least one of the conditions is not satisfied, the authentication fails.

According to Modification Example (7), the authentication is executed further based on the determination result indicating whether or not the input image shows the paper sheet on which the card C has been formed, to thereby be able to effectively enhance the security in possession authentication. For example, even when a third party obtains the paper sheet on which the card C has been copied in some way, the obtained paper sheet cannot be utilized for successful authentication, to thereby be able to achieve more robust security.

(8) Further, for example, a malicious third party may obtain image data of the card C. In this case, there is a fear in that the third party inputs the image data as the input image, and hence it may be determined whether or not the card C captured in the input image is the card C that has been generated by the photographing unit 36 of the user terminal 30.

The authentication system S according to this modification example includes the photographing determination module 107. The photographing determination module 107 determines whether or not the input image has been generated by the photographing unit 36 of the user terminal 30. That is, the photographing determination module 107 determines whether the input image is an input image generated by the photographing unit 36 of the user terminal 30 or an input image transferred to the user terminal 30 after having been photographed by another camera instead of the photographing unit 36 of the user terminal 30.

For example, when the card C is photographed by the photographing unit 36, the user terminal 30 generates photographing identification information that can identify the fact, and transmits the photographing identification information together with the input image. The photographing determination module 107 determines whether or not the photographing identification information has been received, to thereby determine whether or not the input image has been generated by the photographing unit 36 of the user terminal 30. When the photographing identification information is received, the determination is affirmative, and when the photographing identification information is not received, the determination is negative.

The above-mentioned determination method may be any method. For example, information that can identify a terminal that has generated the input image is added to the input image, and the photographing determination module 107 refers to the added information to determine whether or not the input image has been generated by the photographing unit 36 of the user terminal 30. When this information indicates the user terminal 30, the determination is affirmative, and when this information does not indicate the user terminal 30, the determination is negative.

In another case, for example, it may be requested to photograph the card C at a predetermined angle on the photographing screen G1. This angle may be an oblique angle instead of a frontal angle. For example, it may be requested to photograph the card C at an angle randomly selected from a plurality of angles. In this case, it is assumed that the card C has been photographed at the same angle as the requested angle in the registered image. In another case, for example, the card C may be photographed at a predetermined angle at a time point of generating the registered image, and the angle may be stored in the card database DB2. On the photographing screen G1, it may be requested to photograph the card C at that angle.

The photographing determination module 107 identifies the angle at which the card C has been photographed based on the shape and distortion degree of the contour of the card C included in the input image. The photographing determination module 107 may determine whether or not the identified angle is the angle requested by the user, to thereby determine whether or not the input image has been generated by the photographing unit 36 of the user terminal 30. It is highly likely that the photograph of the card C obtained by a malicious third party in some way has not been acquired at such an angle, and hence the above-mentioned determination may be executed by determining the angle at which the card C has been photographed.

The authentication module 102 executes the authentication further based on the determination result obtained by the photographing determination module 107. When the input image and the registered image are similar and it is determined that the input image has been generated by the photographing unit 36 of the user terminal 30, the authentication is successful. When it is not determined that the input image has been generated by the photographing unit 36 of the user terminal 30, or when the input image and the registered image are dissimilar, the authentication fails. That is, in this modification example, there are two conditions for successful authentication, and satisfying both the two conditions is the condition for successful authentication. When even at least one of the conditions is not satisfied, the authentication fails.

According to Modification Example (8), the authentication is executed further based on the determination result indicating whether or not the input image has been generated by the photographing unit 36 of the user terminal 30, to thereby be able to effectively enhance the security. For example, even when a third party obtains the image data on the card C in some way, the obtained image data cannot be utilized for successful authentication, to thereby be able to achieve more robust security.

(9) Further, for example, the authentication may be executed by causing the user to select the design of the background of the card C instead of using image processing. The user cannot select the correct design unless he or she actually possesses the card C, and hence selecting the design of the background is also one kind of possession authentication. In this modification example, the display control module 301 causes the user terminal 30 to display a selection screen for selecting one of a plurality of types of designs.

Figure 15:
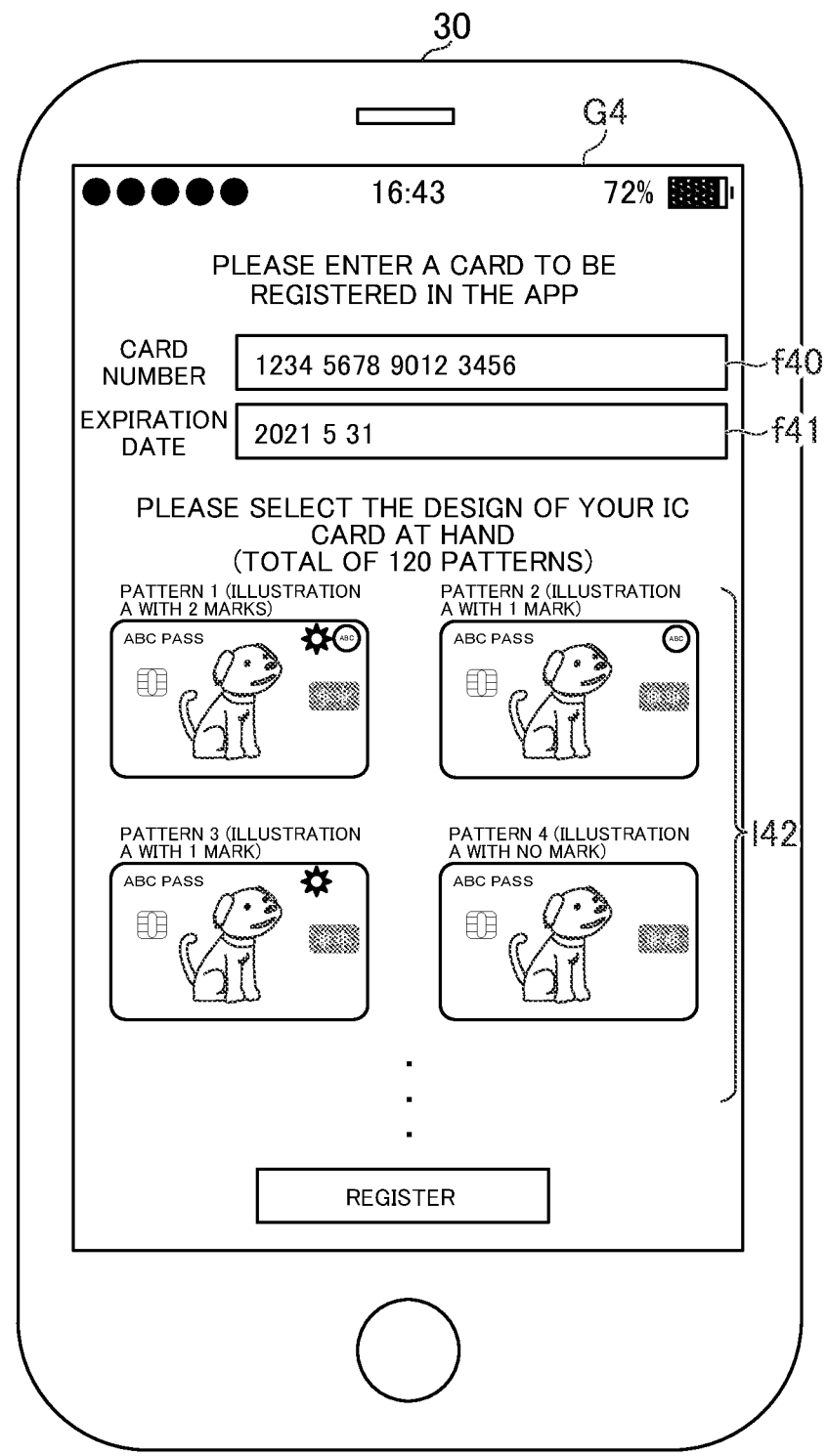
FIG. 15 is a view for illustrating an example of a selection screen.

FIG. 15 is a view for illustrating an example of the selection screen. As illustrated in FIG. 15, on a selection screen G4, an input form f40 for inputting the card number of the card C to be registered, an input form f41 for inputting the expiration date of the card C to be registered, and a list 142 of designs of the card C are displayed. In this modification example, the input image is not generated, and hence the user manually inputs the card number and other information.

In the list 142, a plurality of types of designs are displayed in a selectable manner. In the example of FIG. 15, designs of 120 patterns are displayed in the list 142, but the number of patterns that can be selected by the user may be any number. As illustrated in FIG. 15, patterns are different even when the presence or absence of a mark is different. Although not shown in FIG. 15, when there are cards C on which a cat character and an athlete are drawn, the cards C of those patterns are also displayed in a selectable manner. The list 142 may include a dummy design as well as the cards C actually issued by the issuer.

In this modification example, the input information indicates the type of the design selected on the selection screen G4. The type of the design may be identified by an ID that uniquely identifies the type. The input information is an ID indicating the type of the design selected by the user. The registered information indicates one of the plurality of types of designs. In the case of the registered information as well, when the card C is issued, an ID indicating the type of the design of the card C may be stored into the card database DB2 as the registered information.

The authentication module 102 executes the authentication based on the type of the design indicated by the input information and the type of the design indicated by the registered information. When those types match, the authentication is successful. When those types do not match, the authentication fails. That is, when the ID indicated by the input information and the ID indicated by the registered information match, the authentication is successful, and when those do not match, the authentication fails. The user may select the design of the background or the design of the foreground. The user may also select both the designs of the background and the foreground.

According to Modification Example (9) of the present disclosure, the authentication is executed based on the input image showing the type of the design selected on the selection screen G4 and the registered image showing one of the plurality of types of designs, to thereby be able to effectively enhance the security in possession authentication. For example, it is not required to photograph the card C on the user terminal 30, and hence the authentication can be executed even when the photographing unit 36 is not provided. In addition, it is not required to execute the image processing on the input image for the authentication, and hence the authentication can be completed quickly. Through simplification of the processing for the authentication, it is possible to reduce the processing loads on the business entity server 10 and the issuer server 20.

(10) Further, for example, the case in which the authentication system S is applied to the transportation-related service has been described, but the authentication system S can also be applied to services including an electronic payment service, an electronic commerce service, an electronic ticket service, a check-in service, a financial service, a communication service, and a social media service. In this modification example, a case in which the authentication system S is applied to the electronic payment service is described.

In this modification example, a credit card is described as an example of the card C. The card C is not limited to the credit card, and may be any card C that can be used for the electronic payment service. For example, the card C may be a cash card, a debit card, a loyalty card, an electronic money card, or the card C for another electronic value.

The business entity in this modification example is a company that provides an electronic payment service. The issuer is a company that issues a credit card. Accordingly, in this modification example, the business entity and the issuer are different. The business entity and the issuer cooperate with each other, and any data can be transmitted between the business entity server 10 and the issuer server 20. The business entity and the issuer may companies belonging to the same group.

The card database DB2 of the issuer server 20 stores the card information of an issued credit card. For example, the card information includes a credit card number, an expiration date, a full name, and a security code. In the registered image, at least one of the front side or the back side of the credit card has been captured. Each time the issuer issues a credit card, the issuer photographs the credit card to generate a registered image, and stores the registered image into the card database DB2 together with the card information.

The user database DB1 of the business entity server 10 stores the card information of the credit card registered in the app. The app in this modification example is an electronic payment app. The electronic payment app enables electronic payment to be performed by various methods. For example, a user selects a credit card to be used for payment, and causes a bar code or a two-dimensional code to be displayed on the user terminal 30 and to be read by a reader at a shop, to thereby execute the payment using the credit card. In another case, for example, when the photographing unit 36 of the user terminal 30 reads a bar code or a two-dimensional code provided by the shop, payment using a credit card selected by a user is executed. It suffices that the electronic payment app can execute payment using a registered credit card, and the payment method itself is not limited to those examples. For example, the payment using the registered credit card may be executed without particularly using a code.

When the same flow as that of the first embodiment is taken as an example, the user activates the electronic payment app installed on the user terminal 30, and photographs a credit card by the photographing unit 36. The user terminal 30 generates an input image in which the photographed credit card has been captured, and transmits the input image to the business entity server 10. The business entity server 10 transfers the input image to the issuer server 20, and the issuer server 20 subjects the input image to the optical character recognition to acquire the credit card number.

The issuer server 20 refers to the card database DB2 to acquire the registered image associated with this credit card number. The issuer server 20 compares the input image and the registered image to each other, and transmits the comparison result to the business entity server 10. The business entity server 10 refers to the comparison result to execute the authentication. When the authentication is successful, the business entity server 10 registers the credit card number and other information in the user database DB1.

In this modification example as well, the registration processing can be performed in the same flow as that of the second embodiment. In this case, the registered image database DB3 of the business entity server 10 stores a pair of the credit card number and the registered image. When the business entity server 10 receives the input image, the business entity server 10 performs the optical character recognition thereon to acquire the credit card number. The business entity server 10 refers to the registered image database DB3 to acquire the registered image associated with the credit card number. The business entity server 10 compares the input image and the registered image to each other, to thereby execute the authentication. When the authentication is successful, the business entity server 10 registers the credit card number and other information in the user database DB1.

According to Modification Example (10) of the present disclosure, the security exhibited when a credit card is registered for an electronic payment service is enhanced.

(11) Further, for example, the modification examples described above may be combined.

Further, for example, the authentication system S may execute the authentication by comparing the card information (for example, the expiration date and the full name) acquired by performing the optical character recognition on the input image and the card information (for example, the expiration date and the full name) stored in the card database DB2 to each other. When those pieces of information match, the authentication is successful. When those pieces of information do not match, the authentication fails. The comparison therebetween may be executed by the issuer server 20 as in the first embodiment, or may be executed by the business entity server 10 as in the second embodiment.

Further, for example, the authentication system S may execute the authentication based on the input image and the registered information having a format other than the image. For example, the registered information may be a label indicating the type of an illustration drawn as the background of the card C. For example, assuming that there are 10 types of variations in the illustration of the card C issued by the issuer, the registered information may indicate a type to which the type of the illustration corresponds among those types of illustrations. In this case, the learning model is a model for labeling the input image among the 10 types of illustrations.

The authentication system S inputs the input image to the learning model, and acquires a label output from the learning model. The card database DB2 stores an illustration novel of the background drawn on the card C of the user as the registered information. The authentication system S determines whether or not the label output from the learning model and the label indicated by the registered information match. When those labels match, the authentication is successful. When those labels do not match, the authentication fails. The comparison therebetween may be executed by the business entity server 10 as in the first embodiment, or may be executed by the business entity server 10 as in the second embodiment.

Further, for example, the card C may be an insurance card, a driver's license, a membership card, a student ID card, or another card. The card C to be utilized for the possession authentication may be an electronic card C (virtual card C) instead of a physical card C. Further, for example, when the similarity degree between the input image and the registered image is smaller than a threshold value, the determination may be manually performed by an administrator. Further, for example, when the authentication corresponding to a certain card number fails a predetermined number of times, the card number may be restricted so that no further authentication is executed thereon. In this case, the card number may be restricted so that the card number is not registered in the app unless permission is granted by the administrator.

Further, for example, the authentication performed when the card C is to be registered in the app is taken as an example, but the authentication system S can be applied to the authentication performed in various situations. For example, the authentication system S can also be applied to a situation in which the payment using the card C is executed. In this case, in the situation in which payment is required in the electronic commerce service, the user inputs the card C to be used for the payment, and photographs the card C. The authentication system S executes the authentication in the same manner as in the first embodiment or the second embodiment. When the authentication is successful, the payment using the card C may be executed, and when the authentication fails, the payment using the card C may be inhibited from being executed. In addition, for example, the authentication system S may be applied to a situation in which the possession authentication of the card C corresponding to an identification card or another certificate is executed. The authentication system S may be applied to a situation in which the possession authentication of the card C corresponding to an examination card for an online examination is executed.

Further, for example, the case in which the main functions are shared by the business entity server 10 and the issuer server 20 has been described, but each function may be implemented by one computer. Further, for example, the function described as being implemented by the business entity server 10 may be implemented by the issuer server 20. In contrast, the function described as being implemented by the issuer server 20 may be implemented by the business entity server 10. Further, for example, each function may be shared by three or more computers.

The invention claimed is:

1. An authentication system, comprising:
    at least one memory configured to store computer program code;
    at least one processor configured to read the program code and operate as instructed by the program code, the program code comprising:
        input code configured to cause at least one of the at least one processor to acquire input information, which relates to a feature of an outer appearance of a card possessed by a user, and has been input from a user terminal;
        identification code configured to cause at least one of the at least one processor to acquire identification information that enables identification of the card;
        registration code configured to cause at least one of the at least one processor to acquire registered information, which relates to the feature of the outer appearance, and has been registered in a server in association with the identification information in advance; and
        authentication code configured to cause at least one of the at least one processor to execute authentication based on the input information and the registered information, wherein the executing authentication comprises providing the input information and the registered information to a learning model, and
    wherein the learning model is a neural network, and further comprising, prior to executing authentication, training the learning model based on pairs of images deemed similar.

2. The authentication system according to claim 1,
    wherein the input information comprises an input image showing the card, and
    wherein the at least one processor is configured to execute the authentication based on the input image and the registered information.

3. The authentication system according to claim 2,
    wherein the registered information comprises a registered image showing the card, and
    wherein the at least one processor is configured to execute the authentication based on the input image and the registered image.

4. The authentication system according to claim 1,
    wherein the feature of the outer appearance comprises a design of a background of the card, and
    wherein the at least one processor is configured to execute the authentication based on the design of the background shown in the input information and the design of the background shown in the registered information.

5. The authentication system according to claim 4,
    wherein the background comprises an illustration or photograph on the card, and p1 wherein the at least one processor is configured to execute the authentication based on a design of the illustration or photograph shown in the input information and a design of the illustration or photograph shown in the registered information.

6. The authentication system according to claim 4,
    wherein the cards of the same type have a plurality of types of designs of the background, and
    wherein the at least one processor is configured to execute the authentication based on the type of the design of the background shown in the input information and the type of the design of the background shown in the registered information.

7. The authentication system according to claim 1,
    wherein the feature of the outer appearance comprises a design of a foreground of the card, and
    wherein the at least one processor is configured to execute the authentication based on the design of the foreground shown in the input information and the design of the foreground shown in the registered information.

8. The authentication system according to claim 7,
    wherein the cards of the same type have a plurality of types of designs of the foreground, and
    wherein the at least one processor is configured to execute the authentication based on the type of the design of the foreground shown in the input information and the type of the design of the foreground shown in the registered information.

9. The authentication system according to claim 1,
    wherein the feature of the outer appearance comprises a position of a portion of a foreground of the card, and
    wherein the at least one processor is configured to execute the authentication based on the position of the portion of the foreground shown in the input information and the position of the portion of the foreground shown in the registered information.

10. The authentication system according to claim 2,
    wherein the at least one processor is configured to determine whether the input image shows a paper sheet on which an image of the card has been formed, and
    wherein the at least one processor is configured to execute the authentication further based on a determination result.

11. The authentication system according to claim 2,
    wherein the at least one processor is configured to determine whether the input image has been generated by a camera of the user terminal, and
    wherein the at least one processor is configured to execute the authentication further based on a determination result.

12. The authentication system according to claim 1,
    wherein a background of the card has one of a plurality of types of designs,
    wherein the at least one processor is configured to cause the user terminal to display a selection screen for selecting one of the plurality of types of designs,
    wherein the input information indicates the type of the design selected on the selection screen,
    wherein the registered information indicates one of the plurality of types of designs, and
    wherein the at least one processor is configured to execute the authentication based on the type of the design indicated in the input information and the type of the design indicated in the registered information.

13. The authentication system according to claim 1, further comprising:
   a business entity server corresponding to a business entity that provides a service using the card; and
   an issuer server corresponding to an issuer that has issued the card,
   wherein the issuer server is configured to compare the input information and the registered information to each other, and
   wherein the business entity server is configured to acquire a comparison result from the business entity server, and execute the authentication.

14. The authentication system according to claim 1, further comprising:
   a business entity server corresponding to a business entity that provides a service using the card; and
   an issuer server corresponding to an issuer that has issued the card,
   wherein the registered information has been registered in the issuer server, and
   wherein the business entity server is configured to acquire the registered information from the issuer server.

15. The authentication system according to_claim 1, wherein the at least one processor is configured to execute registration processing relating to the card corresponding to the identification information based on an execution result of the authentication.

16. The authentication system according to claim 1, wherein the registered information comprises a plurality registered image showing the card from a corresponding plurality of different angles.

17. An authentication method, comprising:
   acquiring input information, which relates to a feature of an outer appearance of a card possessed by a user, and has been input from a user terminal;
   acquiring identification information that enables identification of the card;
   acquiring registered information, which relates to the feature of the outer appearance, and has been registered in a server in association with the identification information in advance; and
   executing authentication based on the input information and the registered information, wherein the executing authentication comprises providing the input information and the registered information to a learning model, and
   wherein the learning model is a neural network, and further comprising, prior to executing authentication, training the learning model based on pairs of images deemed similar.

18. A non-transitory computer-readable information storage medium for storing a program for causing a computer to:
   acquire input information, which relates to a feature of an outer appearance of a card possessed by a user, and has been input from a user terminal;
   acquire identification information that enables identification of the card;
   acquire registered information, which relates to the feature of the outer appearance, and has been registered in a server in association with the identification information in advance; and
   execute authentication based on the input information and the registered information, wherein the executing authentication comprises providing the input information and the registered information to a learning model, and
wherein the learning model is a neural network, and further comprising, prior to executing authentication, training the learning model based on pairs of images deemed similar.

* * * * *